United States Patent
Xu et al.

(10) Patent No.: US 7,786,648 B2
(45) Date of Patent: Aug. 31, 2010

(54) SEMI-RESONANT DRIVING SYSTEMS AND METHODS THEREOF

(75) Inventors: Qin Xu, West Henrietta, NY (US); David Henderson, Farmington, NY (US)

(73) Assignee: New Scale Technologies, Victor, NY (US)

( * ) Notice: Subject to any disclaimer, the term of this patent is extended or adjusted under 35 U.S.C. 154(b) by 0 days.

(21) Appl. No.: 12/228,943

(22) Filed: Aug. 18, 2008

(65) Prior Publication Data

US 2010/0038996 A1    Feb. 18, 2010

(51) Int. Cl.
*H02N 2/00* (2006.01)
*H01L 41/09* (2006.01)
*H01L 41/047* (2006.01)

(52) U.S. Cl. ............. 310/317; 310/323.01; 310/323.16; 310/323.17; 310/366

(58) Field of Classification Search ............ 310/316.01, 310/317, 323.01–323.19, 328, 366
See application file for complete search history.

(56) References Cited

U.S. PATENT DOCUMENTS

| | | | |
|---|---|---|---|
| 2,292,886 A * | 8/1942 | Mason | 310/362 |
| 2,439,499 A | 4/1948 | Williams et al. | |
| 4,230,393 A | 10/1980 | Burke, Jr. | |
| 4,523,121 A | 6/1985 | Takahashi et al. | |
| 5,101,449 A | 3/1992 | Takeuchi et al. | |
| 7,026,745 B2 | 4/2006 | Dames | |
| 7,099,093 B2 | 8/2006 | Jeong et al. | |
| 7,157,830 B2 * | 1/2007 | Jansson et al. | 310/317 |
| 7,187,104 B2 * | 3/2007 | Yamamoto et al. | 310/323.02 |
| 2005/0104476 A1 | 5/2005 | Maruyama et al. | |
| 2005/0269903 A1 * | 12/2005 | Budinger et al. | 310/323.01 |
| 2006/0175932 A1 * | 8/2006 | Danell et al. | 310/323.01 |
| 2006/0250047 A1 | 11/2006 | Yamamoto et al. | |
| 2007/0182281 A1 * | 8/2007 | Mori | 310/317 |
| 2008/0144201 A1 | 6/2008 | Koc et al. | |
| 2008/0174889 A1 | 7/2008 | Su et al. | |

OTHER PUBLICATIONS

Uchino et al., "Micromechatronics," Ceramic Actuator Structures and Fabrication Methods, Chapter 4, Marcel Dekker, Inc., New York, pp. 178-218 (2003).
International Search Report for International Patent Application No. PCT/US2009/054157 (Oct. 15, 2009).

* cited by examiner

*Primary Examiner*—Thomas M Dougherty
(74) *Attorney, Agent, or Firm*—Nixon Peabody LLP

(57) ABSTRACT

A driving system in accordance with embodiments of the present invention includes a structure and a vibration system. The structure has at least one point to frictional couple to and drive a movable element in one of at least two directions. The structure also has at least two bending modes which each have a different resonant frequency. The vibration system applies two or more vibration signals which are at a vibration frequency to each of the bending modes of the structure. The vibration frequency is substantially the same as one of the resonant frequencies. At the vibration frequency one of the bending modes of the structure is vibrating substantially at resonance and the other of the bending modes of the structure is vibrating at partial resonance. The vibration system adjusts a phase shift between the two or more applied vibration signals to control which one of the at least two directions the moveable element is moved.

27 Claims, 23 Drawing Sheets

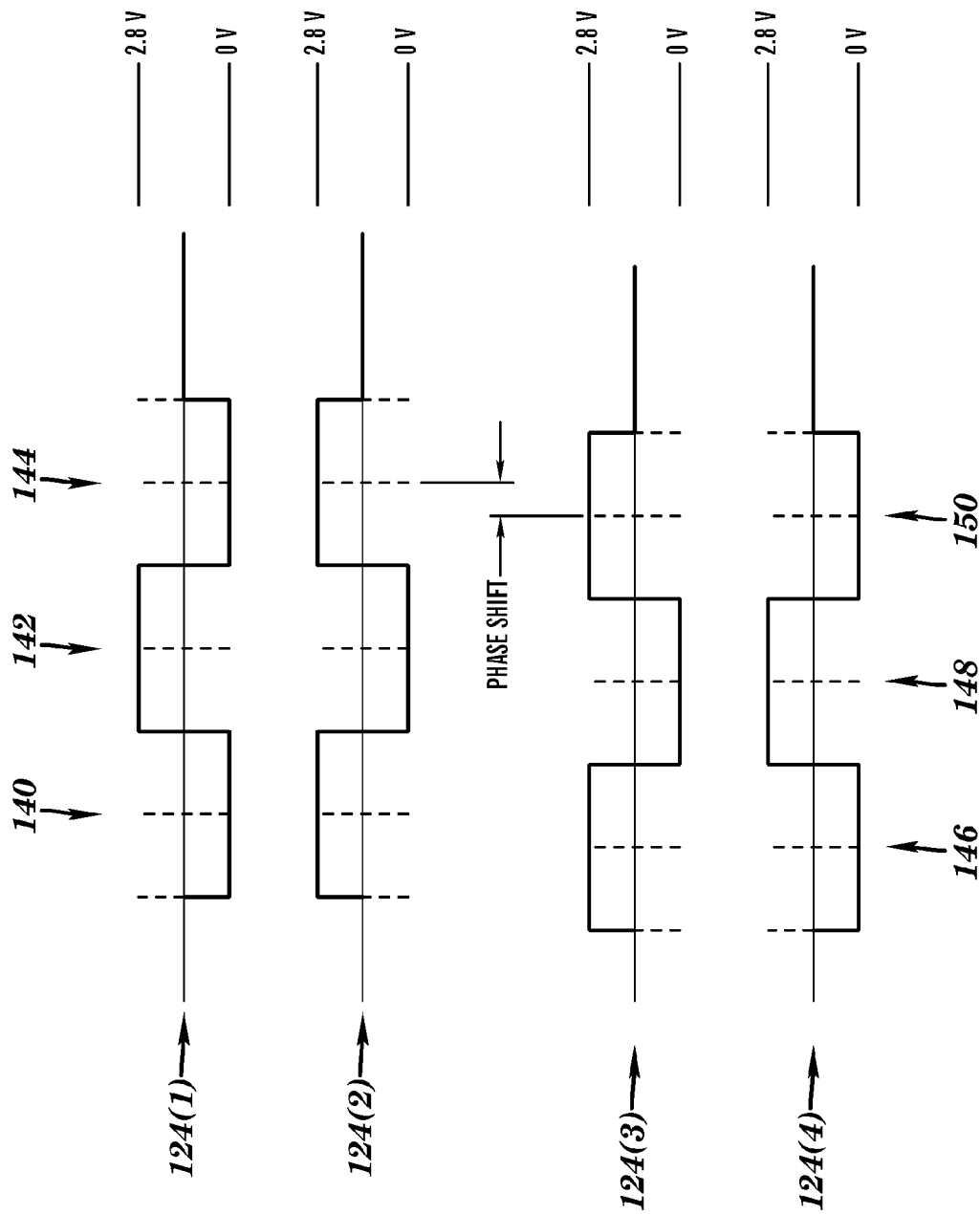

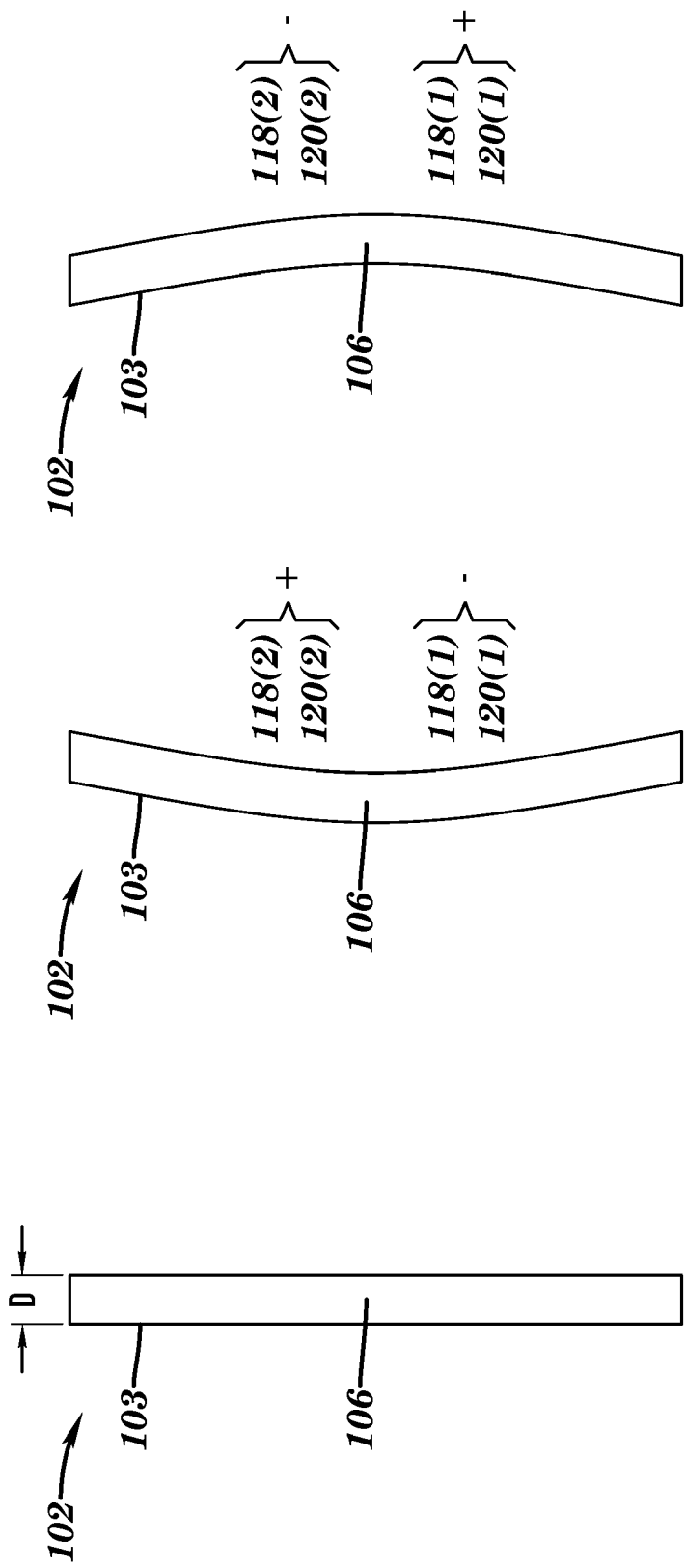

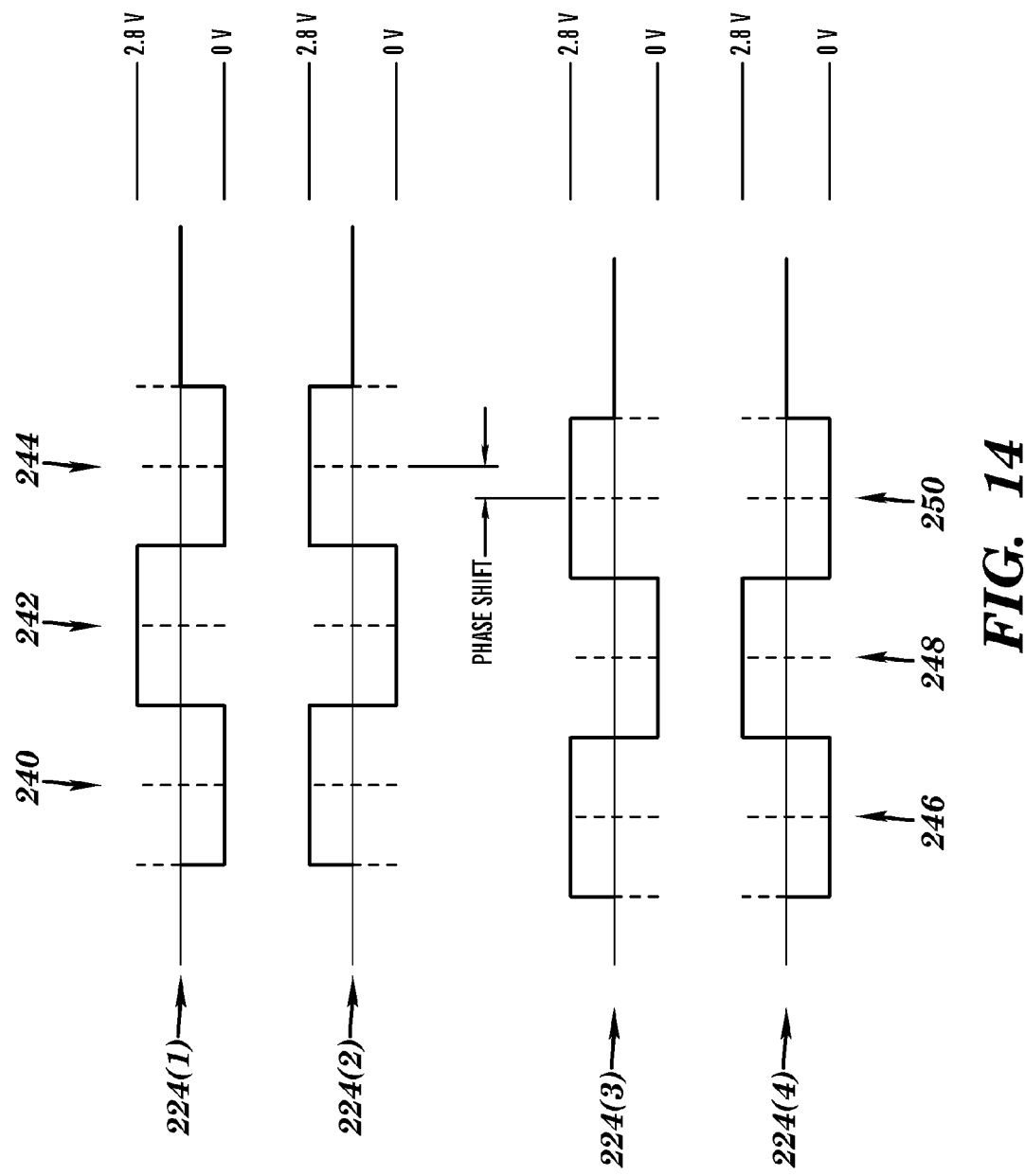

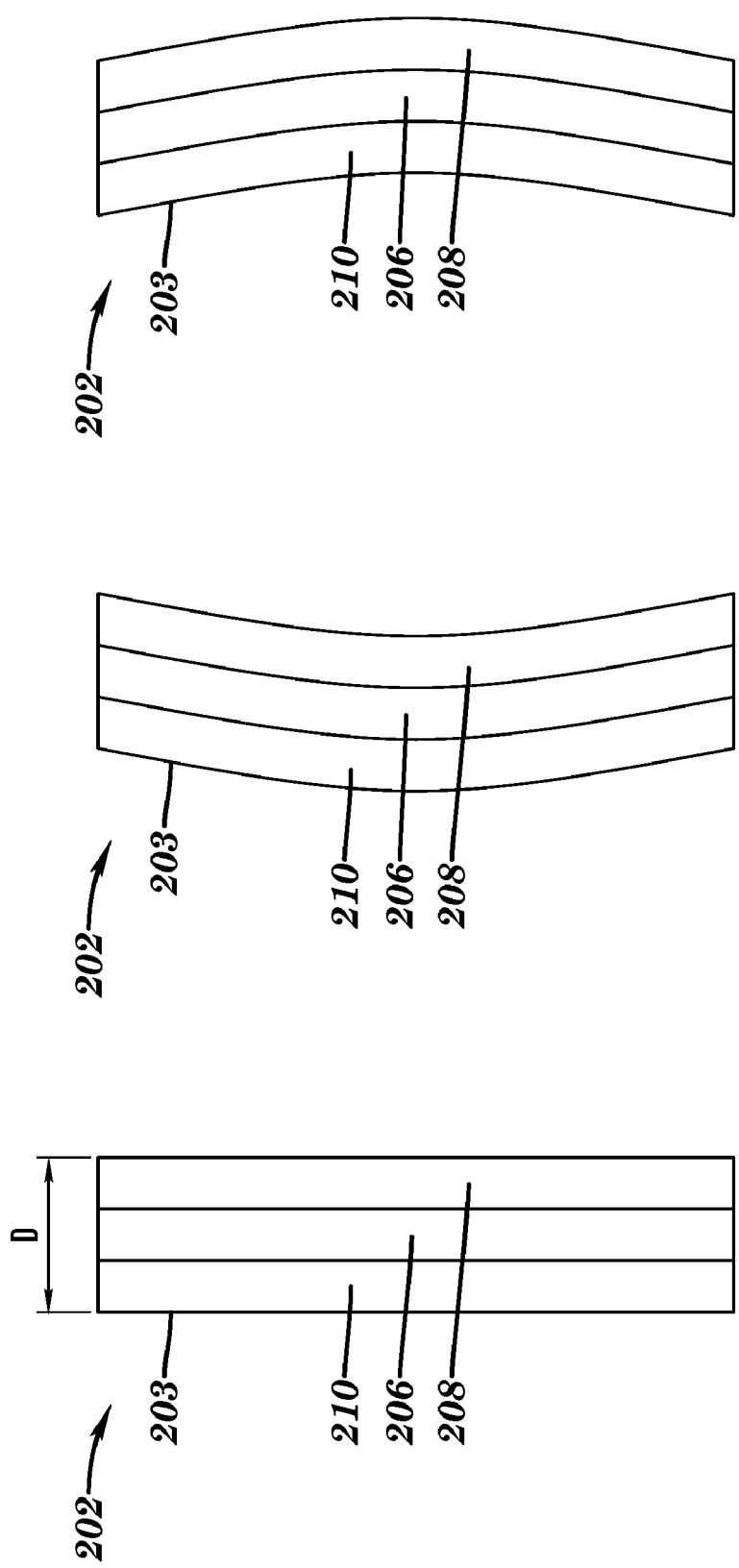

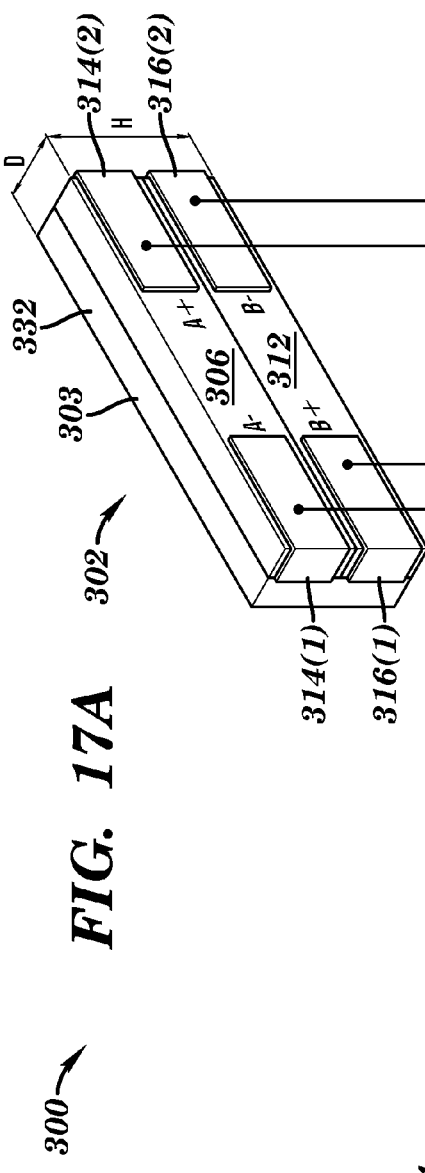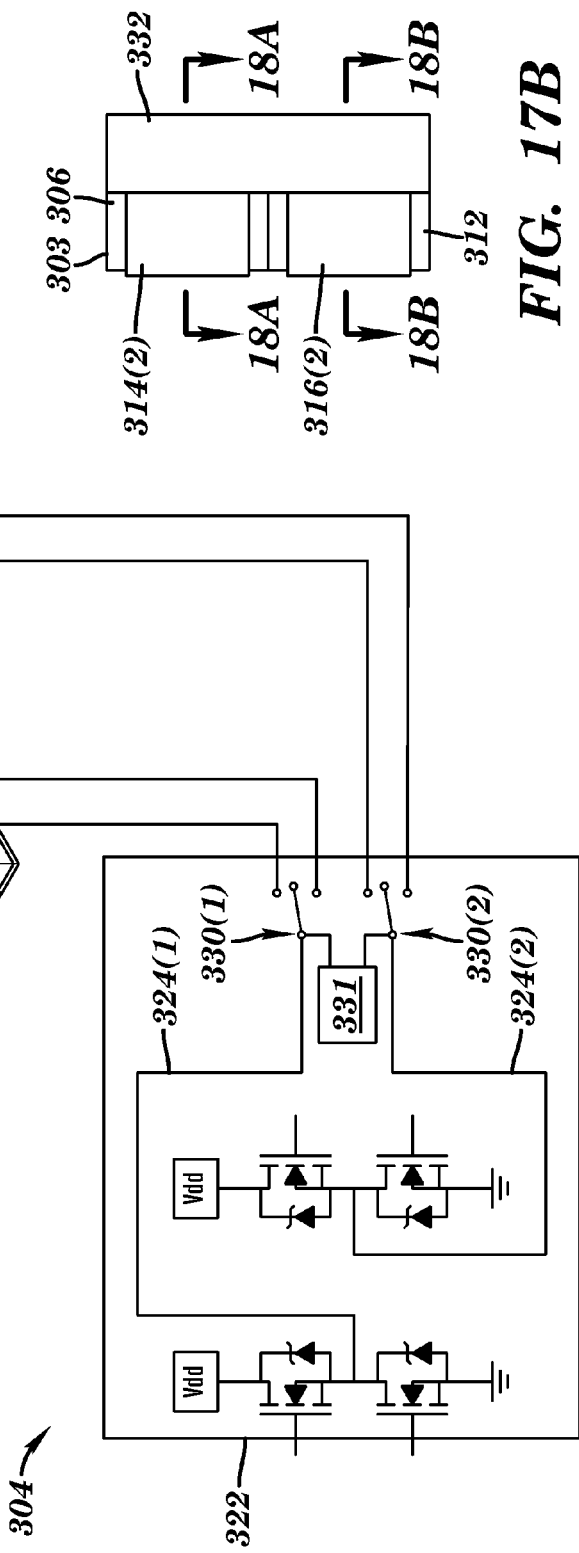

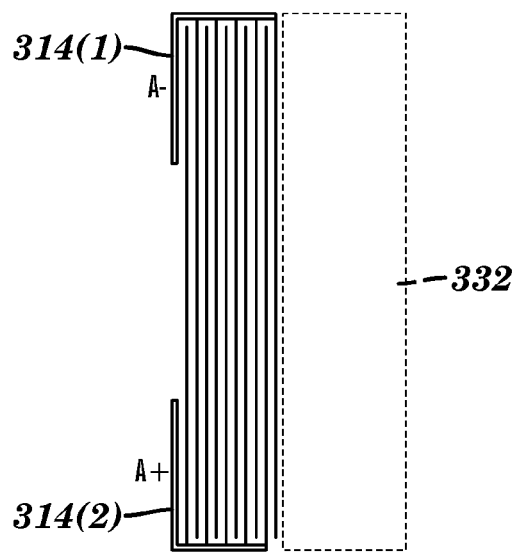
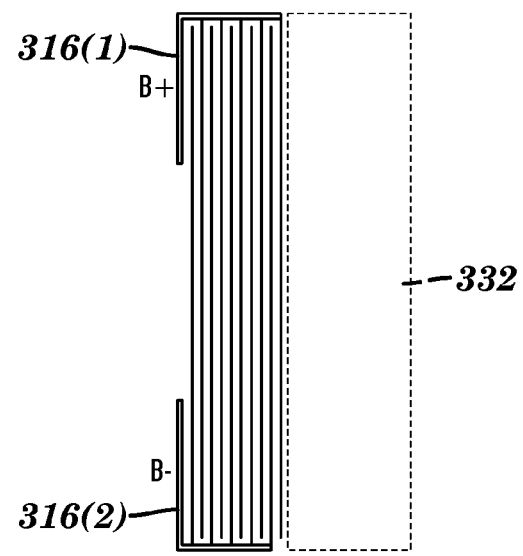
FIG. 18A  FIG. 18B

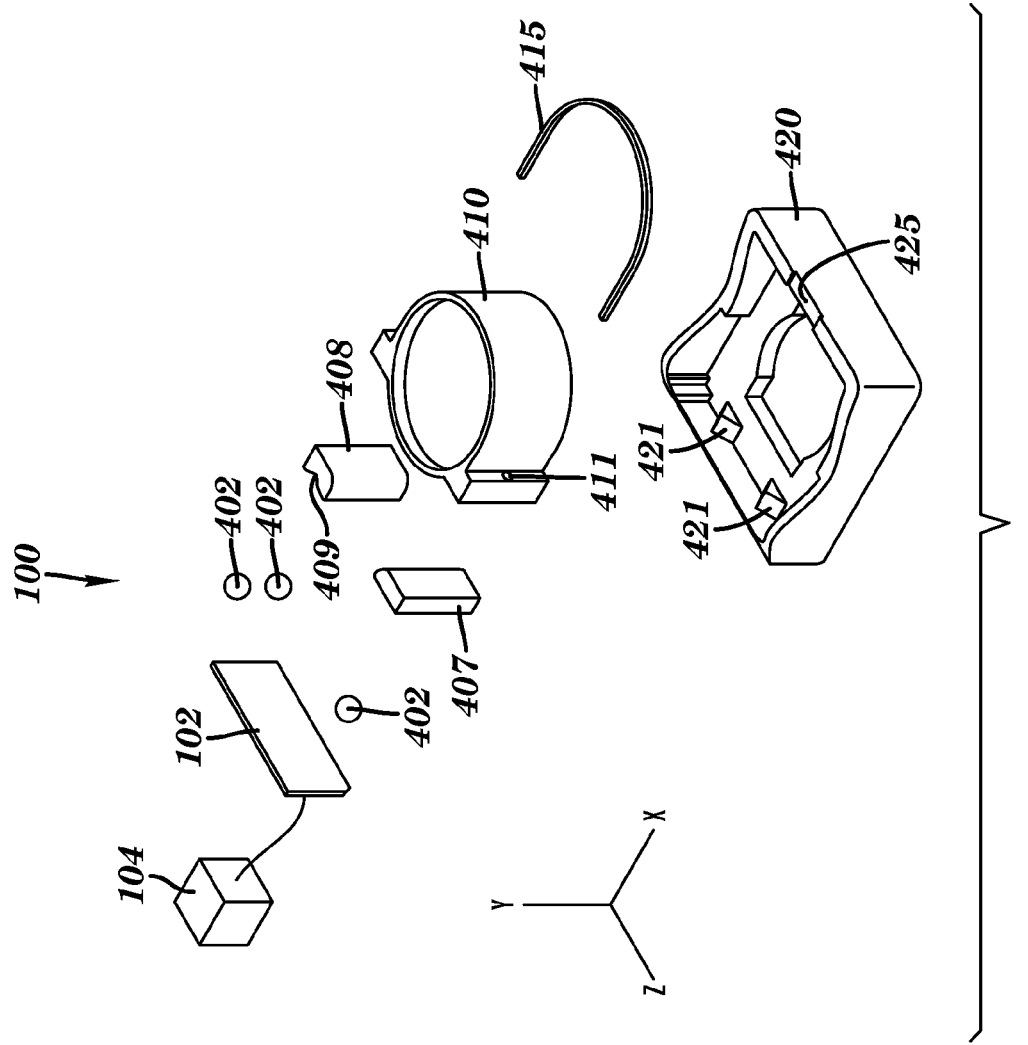
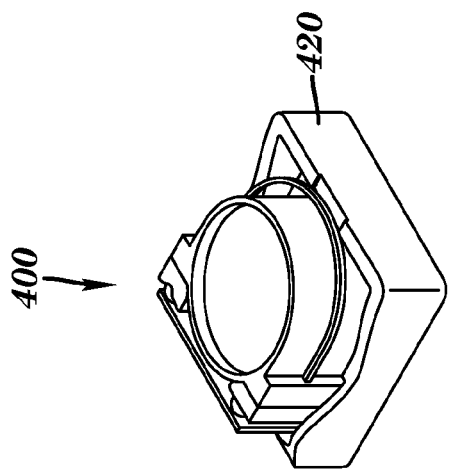
FIG. 22A
FIG. 22B

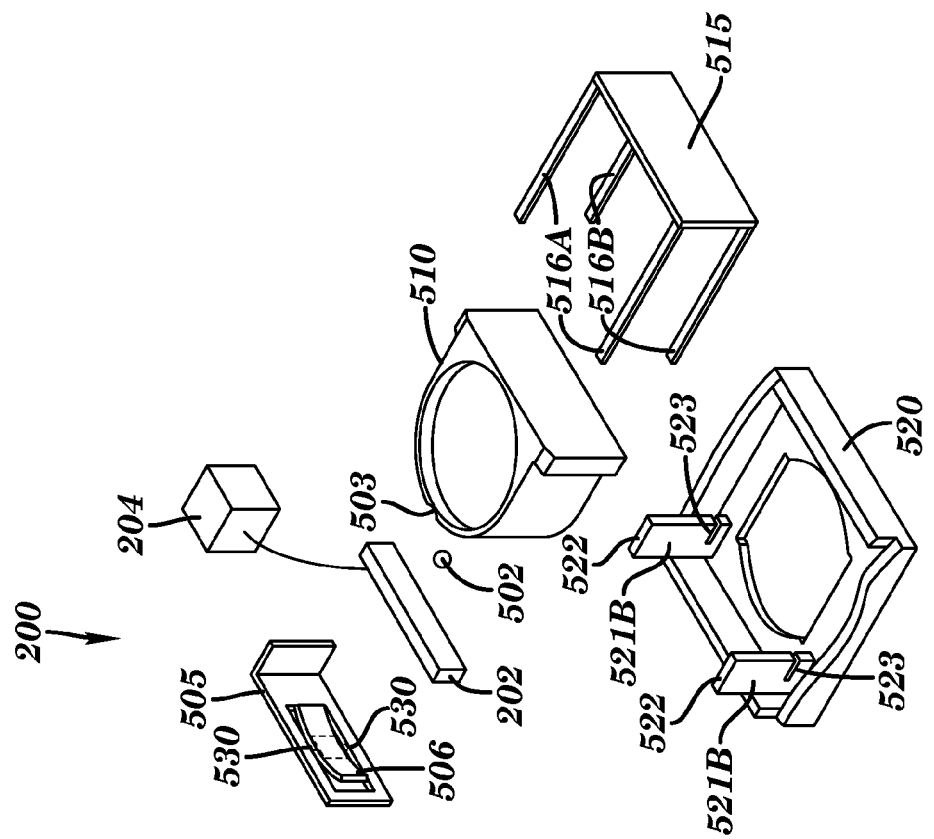
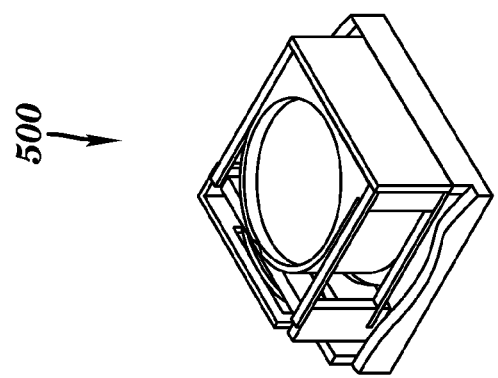

SEMI-RESONANT DRIVING SYSTEMS AND METHODS THEREOF

FIELD OF THE INVENTION

The present invention generally relates to driving systems and methods thereof and, more particularly, relates to a semi-resonant driving systems and methods thereof.

BACKGROUND

Transducers using piezoelectric technologies are used for precise positioning at the nanometer scale. Typically, piezoelectric devices include a ceramic that is formed into a capacitor that changes shape when charged and discharged. These piezoelectric devices can be used as a position actuator because of this shape change property (i.e., vibrations). When the piezoelectric device is used as a position actuator, the shape change is approximately proportional to the applied voltage.

Ultrasonic drivers use these piezoelectric generated vibrations to create continuous movement with high speed, high torque, small size and quiet operation. An exemplary prior art ultrasonic driving system includes a cylinder that supports a threaded nut. The cylinder includes four symmetrically positioned piezoelectric transducers to simultaneous excite the orthogonal bending modes of the cylinder at the first bending mode resonant frequency in the ultrasonic range with a plus or minus 90-degree phase shift in a circular orbit. The threaded nut orbits a threaded shaft at the first bending mode resonant frequency, which generates torque that rotates the threaded shaft that moves the threaded shaft linearly.

Many ultrasonic drivers typically operate at speeds in the range of 100 mm/s to even 1000 mm/s. However, this speed is too fast for precise position control of image sensors and optical camera systems. The image sensors and the sensor's algorithm cannot capture images with sufficient quality because the motion is unstable and the step resolution is poor.

SUMMARY

A driving system in accordance with embodiments of the present invention includes a structure and a vibration system. The structure has at least one point to frictional couple to and drive a movable element in one of at least two directions. The structure also has at least two bending modes which each have a different resonant frequency. The vibration system applies two or more vibration signals which are at a vibration frequency to each of the bending modes of the structure. The vibration frequency is substantially the same as one of the resonant frequencies. At the vibration frequency one of the bending modes of the structure is vibrating substantially at resonance and the other of the bending modes of the structure is vibrating at partial resonance. The vibration system adjusts a phase shift between the two or more applied vibration signals to control which one of the at least two directions the moveable element is moved.

A method for making a driving system in accordance with others embodiments of the present invention includes providing a structure having at least one point to frictional couple to and drive a movable element in one of at least two directions. The structure has at least two bending modes which each have a different resonant frequency. A vibration system that applies two or more vibration signals which are at a vibration frequency is coupled to each of the bending modes of the structure. The vibration frequency is substantially the same as one of the resonant frequencies. At the vibration frequency one of the bending modes of the structure is vibrating substantially at resonance and the other of the bending modes of the structure is vibrating at partial resonance. The vibration system adjusts a phase shift between the two or more applied vibration signals to control which one of the at least two directions the moveable element is moved.

An optical system in accordance with other embodiments of the present invention includes at least one optical component and at least one driving system. The driving system comprises a vibration system and a structure that is frictionally coupled to move the optical component in one or more directions. The structure has at least two bending modes which each have a different resonant frequency. The vibration system applies two or more vibration signals which are at a vibration frequency to each of the bending modes of the structure. The vibration frequency is substantially the same as one of the resonant frequencies. At the vibration frequency one of the bending modes of the structure is vibrating substantially at resonance and the other of the bending modes of the structure is vibrating at partial resonance. The vibration system adjusts a phase shift between the two or more applied vibration signals to control which one of the at least two directions the moveable element is moved.

The present invention provides a number of advantages including providing a more effective and efficient semi-resonant driving system. The semi-resonant driving system can be used to move a variety of different loads in a variety of different applications, such as in auto-focus systems and auto-zoom systems in cameras by way of example only.

BRIEF DESCRIPTION OF THE DRAWINGS

FIG. 3 is a diagram of an example of signals applied by the vibration system to the actuator system illustrated in FIG. 1A;

FIGS. 5A-5C are top views of the actuator system for the semi-resonant driving system illustrated in FIG. 1A in operation;

FIG. 14 is a diagram of an example of signals applied by the vibration system to the actuator system illustrated in FIG. 12A;

FIGS. 16A-16C are top views of the actuator system for the semi-resonant driving system illustrated in FIG. 12A in operation;

FIG. 17A is partial perspective view of an actuator system and a partial schematic diagram of a vibration system for yet another semi-resonant driving system in accordance with embodiments of the present invention;

FIG. 17B is a right end view of the actuator system illustrated in FIG. 17A;

FIG. 18A is a cross-sectional, top view of the actuator system taken along lines through 18A-18A in FIG. 17B;

FIG. 18B is a cross-sectional, top view of the actuator system taken along lines through 18B-18B in FIG. 17B;

FIG. 22A is a perspective view of an optical system with a semi-resonant driving system in accordance with embodiments of the present invention;

FIG. 22B is an exploded view of the optical system shown in FIG. 22A;

FIG. 23A is a perspective view of another optical system with another semi-resonant driving system in accordance with embodiments of the present invention; and FIG. 23B is an exploded view of the optical system shown in FIG. 23A.

DETAILED DESCRIPTION

Figures 1A, 1B:
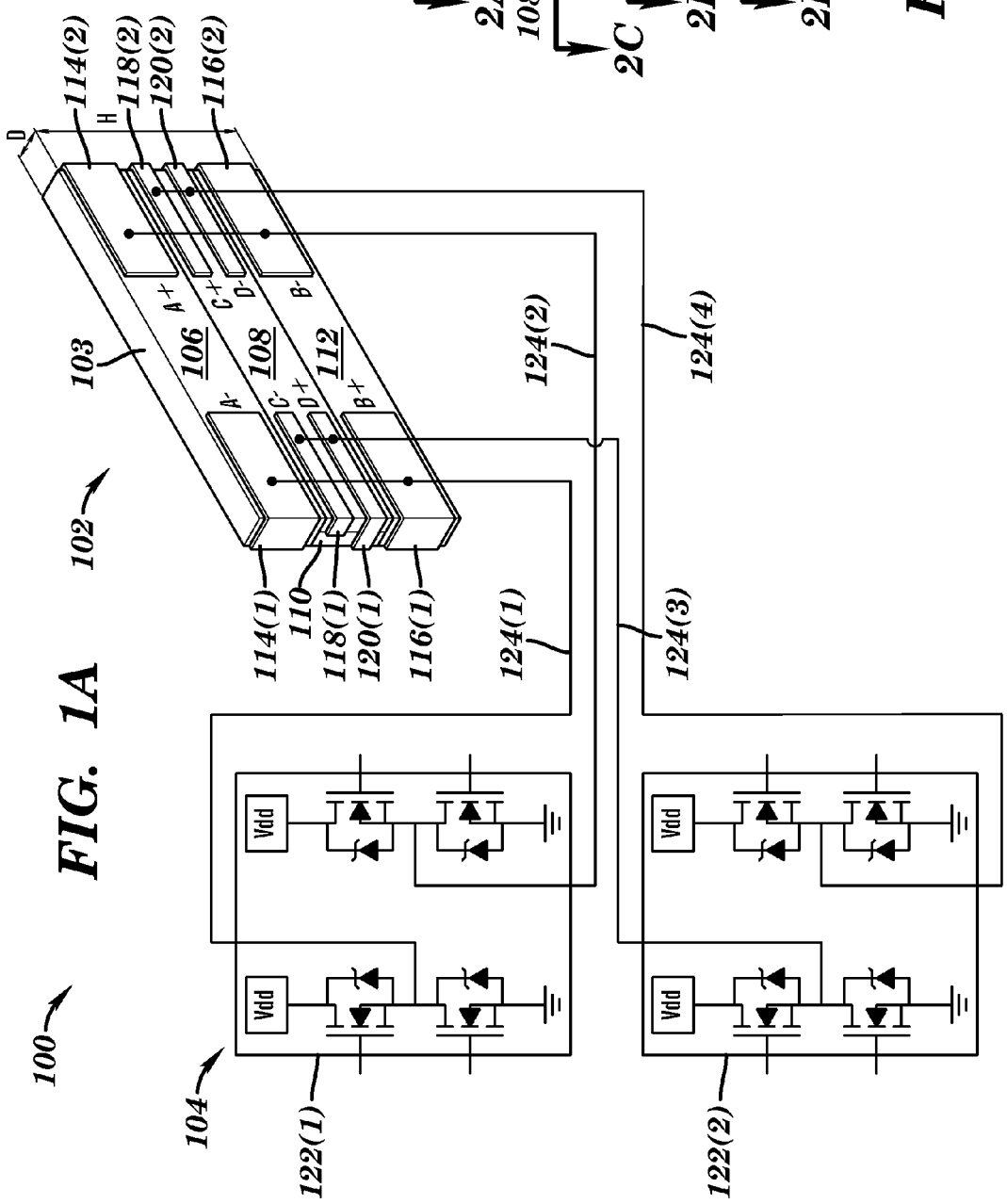
FIG. 1A is partial perspective view of an actuator system and a partial schematic diagram of a vibration system for a semi-resonant driving system in accordance with embodiments of the present invention.
FIG. 1B is an end view of the actuator system illustrated in FIG. 1A.

A semi-resonant driving system 100 in accordance with embodiments of the present invention is illustrated in FIG. 1A. The semi-resonant driving system 100 includes an actuator system 102 and a vibration system 104, although the system 100 can include other types and numbers of systems, device, and components which are connected in other manners. The present invention provides a more effective and efficient semi-resonant driving system.

Referring more specifically to FIGS. 1A and 1B, the actuator system 102 generates a two-dimensional trajectory to frictionally couple to and drive a moveable load, such as an optical lens by way of example only, in either of at least two opposing directions, although the actuator system 102 can generate other types of trajectories, be coupled in other manners and at other locations, and move other types of loads in other directions. The actuator system 102 includes an asymmetrical, elongated structure 103, although the actuator system 102 can comprise other types of structures with other shapes and symmetries. The elongated structure 103 has a depth D with a bending mode having a first resonant frequency "fres1" and a height H with a bending mode having a second resonant frequency "fres2." The height H is generally greater than the depth D so the second resonant frequency "fres2" is higher than first resonant frequency "fres1", although the structure can have other dimensions. By way of example only, other factors that affect resonance frequency include material stiffness, mass, and location and orientation of internal electrodes.

Referring to FIGS. 2A-2D, the elongated structure 103 comprises a plurality of parallel piezoelectric layers that are co-fired together, although the elongated structure 103 could comprises other types and numbers of layers, such as a single layer, other types and numbers of regions, and other manufacturing processes can be used. Each of the piezoelectric layers for the elongated structure 103 is about fourteen micrometers thick, although other thicknesses can be used for each of the layers, such as a thickness between five micrometers to forty micrometers. By using the plurality of piezoelectric layers for elongated structure 103 a lower applied voltage can be used, than is possible when a single piezoelectric layer is used for the elongated structure 103.

Referring back to FIG. 1A, the elongated structure 103 includes four piezoelectric regions 106, 108, 110, and 112, and electrodes 114(1) and 114(2), electrodes 116(1) and 116(2), electrodes 118(1) and 118(2), and electrodes 120(1) and 120(2), although the structure can comprise other numbers and types of structures with other numbers and types of regions and connectors. By way of example only, in alternative embodiments one of the two piezoelectric regions 106 and 112 and one of the piezoelectric regions 108 and 110, could be inactive which would reduce the drive amplitude, but otherwise would not alter the operation of the actuator system, although other combinations of active and inactive regions could be used.

Each piezoelectric region has a polarity that is established by poling during manufacturing, creating a positive electrode and a negative electrode. The piezoelectric regions 106, 108, 110, and 112 are poled during manufacturing so that "L" shaped electrode 114(1) is negative (A−) and "L" shaped electrode 114(2) is positive (A+) for region 106, "L" shaped electrode 116(2) is negative (B−) and "L" shaped electrode 116(1) is positive (B+) for region 112, "L" shaped electrode 118(1) is negative (C−) and "L" shaped electrode 118(2) is positive (C+) for region 108, "L" shaped electrode 120(2) is negative (D−) and "L" shaped electrode 120(1) is positive (D+) for region 110, although the piezoelectric regions can be formed in other manners. In the elongated structure 103, the piezoelectric regions 108 and 110 are located adjacent each other and between outer piezoelectric regions 106 and 112 as illustrated, although the structure could have other numbers of piezoelectric regions in other configurations.

Figure 2A:
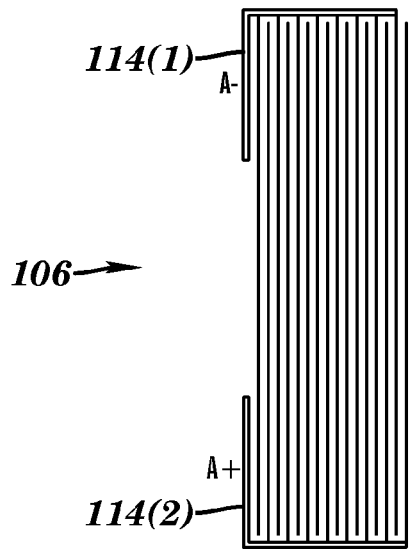
FIG. 2A is a cross-sectional, top view of the actuator system taken along lines through 2A-2A in FIG. 1B.
Figure 2B:
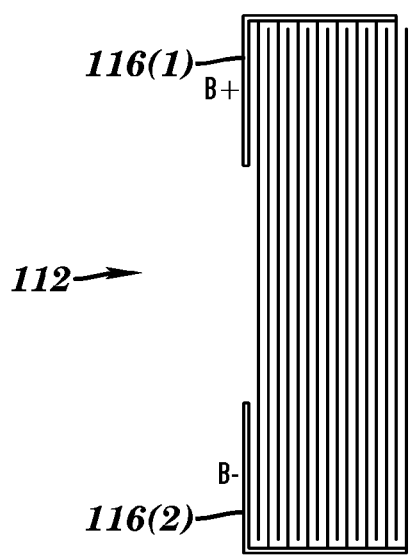
FIG. 2B is a cross-sectional, top view of the actuator system taken along lines through 2B-2B in FIG. 1B.
Figure 2C:
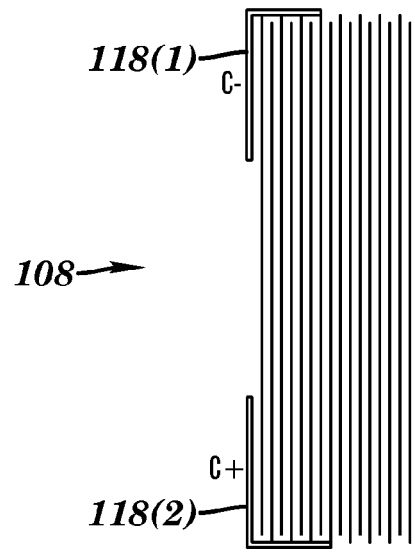
FIG. 2C is a cross-sectional, top view of the actuator system taken along lines through 2C-2C in FIG. 1B.
Figure 2D:
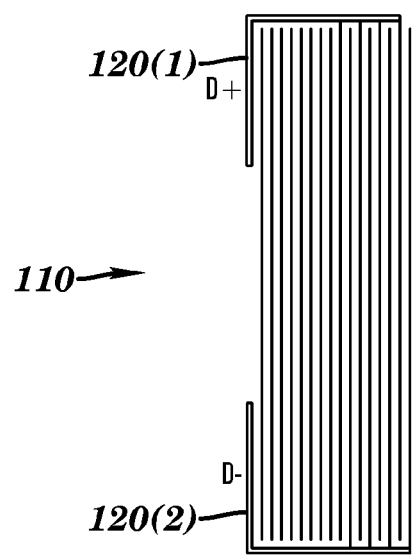
FIG. 2D is a cross-sectional, top view of the actuator system taken along lines through 2D-2D in FIG. 1B.

Referring to FIGS. 1A, 1B, and 2A, the electrode 114(1) is coupled to and interleaved to be connected to one internal electrode of each of the piezoelectric layers for piezoelectric region 106 and electrode 114(2) is interleaved to be connected to the opposing internal electrode of each of the piezoelectric layers for region 106, where the poling process establishes region 106 polarity as electrode 114(1) as negative and electrode 114(2) as positive, although other types and numbers of connections at other locations can be used. Referring to FIGS. 1A, 1B, and 2B, the electrode 116(1) is coupled to and interleaved to be connected to one internal electrode of each of the piezoelectric layers for piezoelectric region 112 and electrode 116(2) is interleaved to be connected to the opposing internal electrode of each of the piezoelectric layers for region 112, where the poling process establishes region 112 polarity as electrode 116(2) as negative and electrode 116(1) as positive, although other types and numbers of connections at other locations can be used. Referring to FIGS. 1A, 1B, and 2C, the electrode 118(1) is coupled to and interleaved to be connected to one internal electrode of each of the piezoelectric layers for piezoelectric region 108 and electrode 118(2) is interleaved to be connected to the opposing internal electrode of each of the piezoelectric layers for region 108, where the poling process establishes region 108 polarity as electrode 118(1) as negative and electrode 118(2) as positive, although other types and numbers of connections at other locations can be used. Referring to FIGS. 1A, 1B, and 2D, the electrode 120(1) is coupled to and interleaved to be connected to one internal electrode of each of the piezoelectric layers for piezoelectric region 110 and electrode 120(2) is interleaved to be connected to the opposing internal electrode of each of the piezoelectric layers for region 110, where the poling process establishes region 110 polarity as electrode 120(2) as negative and electrode 120(1) as positive, although other types and numbers of connections at other locations can be used.

Referring back to FIG. 1A, the vibration system 104 comprises a pair of full bridge drive circuits 122(1) and 122(2) each of which are coupled to a voltage source $V_{dd}$ and have four outputs 124(1)-124(4) which provide the ultrasonic, square wave vibration signals illustrated in FIG. 3 by way of example only, although other types and numbers of driving circuits and systems, such as a half bridge circuit system by way of example only, with other number of outputs which provide other types of signals, such as sinusoidal shaped-signals by way of example only, can be used. The output 124(1) from full bridge drive circuit 122(1) is coupled to electrodes 114(1) and 116(1), the output 124(2) from full bridge drive circuit 122(1) is coupled to electrodes 114(2) and 116(2), the output 124(3) from full bridge drive circuit 122(2) is coupled to electrodes 118(1) and 120(1), and the output 124(4) from full bridge drive circuit 122(2) is coupled to electrodes 118(2) and 120(2), although other types and numbers of connections could be used. One of the advantages of the vibration system 104 with the full bridge drive circuits 122(1) and 122(2) is the effective voltage differential across the positive electrode and negative electrode of each of the piezoelectric regions 106, 108, 110, and 112 is twice the supply voltage $V_{dd}$ and effectively doubles the mechanical output compared with a half bridge circuit with the same supply voltage $V_{dd}$, which saves space, although other types of systems could be used. Since the components and operation of full bridge circuits are well known to those of ordinary skill in the art they will not be described in greater detail herein.

The operation of the semi-resonant driving system 100 will now be described with reference to FIGS. 1A-11B. As described above, the elongated structure 103 has two bending modes, mode1 and mode2, which each have a different resonant frequency. The vibration amplitude in either of these bending modes is dependent on the vibration frequency of the applied signals. When the vibration system 104 applies vibration signals at the resonant frequency for one of the bending modes, such as the frequency "fres1" of mode1 to both bending modes of the structure 103, the vibration amplitude is fully amplified for the bending mode operating at its resonant frequency and is only partially amplified for the other bending mode which is operating at partial resonance. When the vibration system 104 applies signals at the resonant frequency "fres2" for the other one of the bending modes, such as the frequency of mode2, to both bending modes of the structure 103, the vibration amplitude is fully amplified for the bending mode operating at its resonant frequency and is only partially amplified for the other bending mode which is operating at partial resonance.

Partial resonance also referred to as semi-resonance herein will now be described in greater detail. In a typical mechanical system under forced excitation at f, the normalized amplitude A is:

$$A = \frac{Q_M}{\sqrt{z^2 + (z^2 - 1)^2 Q_M^2}}$$

where A is the amplitude (relative to DC level $A_o$).

$$z = \frac{f}{f_o}$$

where $f_o$ is the resonant frequency of this system and f is the drive frequency. $Q_M$ is the mechanical quality factor, ($Q_M$ can be as high as 100 or more). A typical amplitude resonance curve for frequency from 0 (DC) to well past resonant frequency ($f_o$), amplitude at DC is normalized to 1; amplitude at resonance (f=$f_o$) is amplified by $Q_M$; amplitude at f>>$f_o$ drops to close to 0. A can range from 1 (at DC) to $Q_M$ at resonant frequency. In these embodiments, partial resonance or semi resonance occurs when A ranges between about 2 to $$\frac{Q_M}{2},$$

although other ranges outside of this range could be used, such as when A is between 1 and $Q_M$ could be used.

Referring to FIGS. 1A and 3, four vibration signals from outputs 124(1)-124(4) of the full bridge drive circuits 122(1) and 122(2) are illustrated, although other numbers and types of signals could be used. In this example, $V_{dd}$ is 2.8 volts. In this example, the four vibration signals provide from the outputs 124(1)-124(4) each have a vibration frequency substantially the same as the resonant frequency of one of the two bending modes of the structure 103. Additionally, the vibration signals from outputs 124(1)-124(2) are phase shifted by the vibration system 104 with respect to the vibration signals from outputs 124(3)-124(4) between about 0 degrees to 90 degrees for moving the movable member in one of the two directions, although other ranges for the phase shift can be used. Additionally, the vibration system 104 adjusts the phase shift to between about −180 degrees to −90 degrees for moving the movable member in the opposite direction between outputs 124(1)-124(2) and outputs 124(3)-124(4), although other ranges for the phase shift can be used.

Figure 4A:
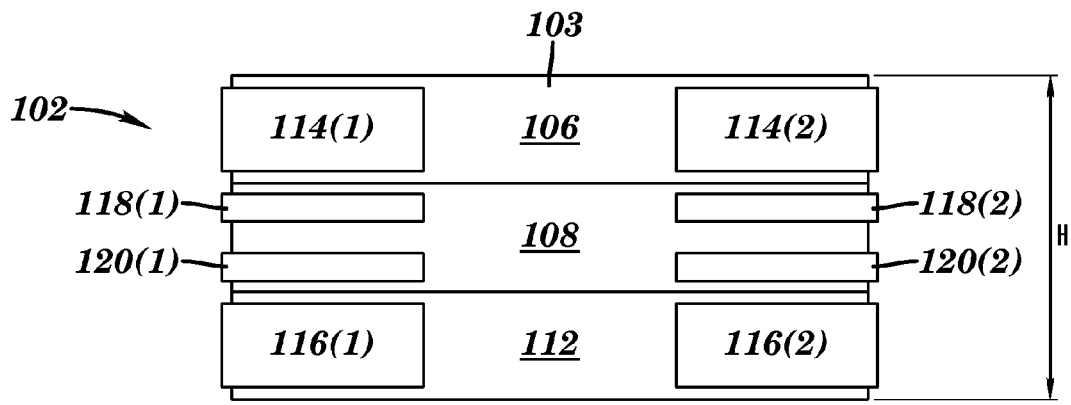
FIGS. 4A-4C are front views of the actuator system for the semi-resonant driving system illustrated in FIG. 1A in operation.
Figure 4B:
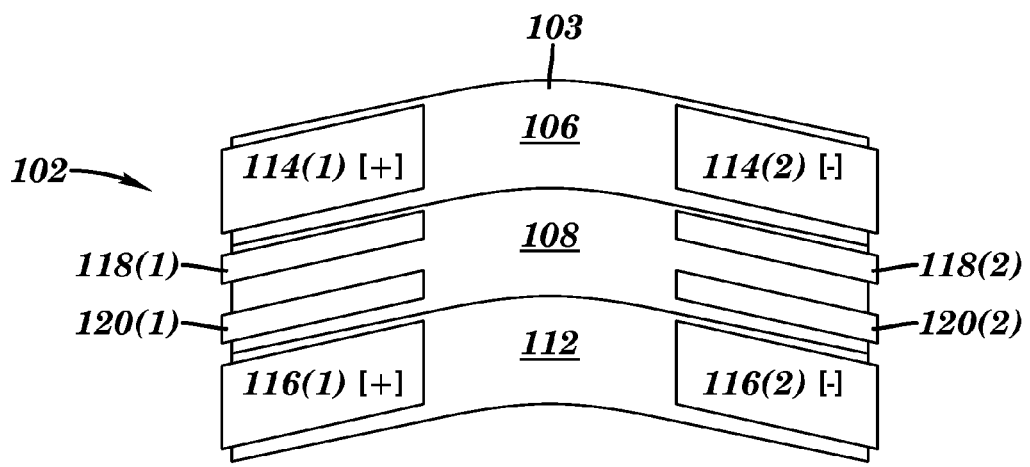
Figure 4C:
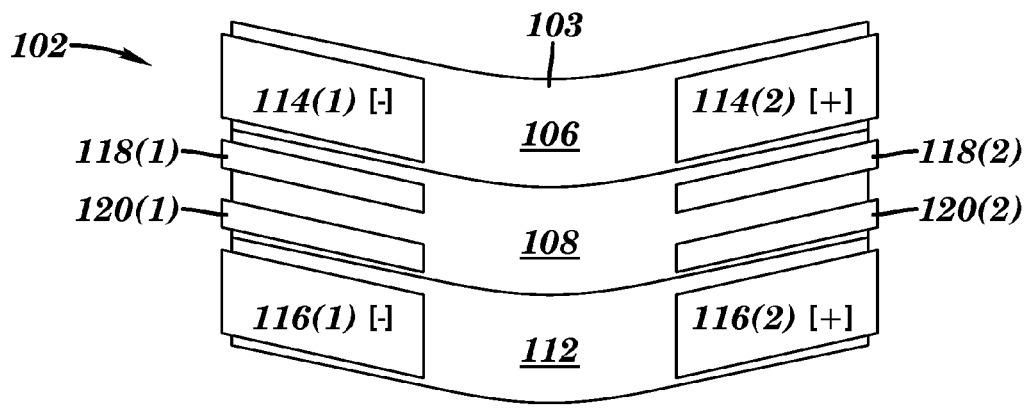

Referring to FIGS. 3 and 4A-4C, the motion of the structure 103 in one of the bending modes resulting from the application of the vibration signals from outputs 124(1)-124(2) at different stages to the opposite polarity piezoelectric regions 106 and 112 are illustrated. FIG. 4(A) is when the structure 103 at rest (voltages to all electrodes are zero). When the voltage difference between outputs 124(1) and 124(2) is positive, as shown in stage 142 in FIG. 3, region 106 increases in length and region 112 decreases in length, which causes the structure 103 to bend as shown in FIG. 4(b). When the voltage difference between outputs 124(1) and 124(2) is negative, as shown in stage 140 or 144 in FIG. 3, region 106 decreases in length and region 112 increases in length, which causes the structure 103 to bend as shown in FIG. 4(c). Vibration signal from output 124(1) is applied to the electrodes 114(1) (A−) and 116(1) (B+) and the vibration signal from output 124(2) is applied to the electrodes 114(2) (A+) and 116(2) (B−).

Referring to FIGS. 3 and 5A-5C, the motion of the structure 103 in the other one of the bending modes resulting from the application of the vibration signals from outputs 124(3)-124(4) at different stages to the opposite polarity piezoelectric regions 108 and 110 are illustrated. FIG. 5(A) is when the structure 103 is at rest (voltages to all electrodes are zero). When the voltage difference between outputs 124(3) and 124(4) is positive, as shown in stage 146 or 150 in FIG. 3, region 108 decreases in length and region 110 increases in length, which causes the structure 103 to bend as shown in FIG. 5(b). When the voltage difference between outputs 124(3) and 124(4) is negative, as shown in stage 148 in FIG. 3, region 108 increases in length and region 110 decreases in length, which causes the structure 103 to bend as shown in FIG. 5(c). The vibration signal from output 124(3) is applied to the electrodes 118(1) (C−) and 120(1) (D+) and the vibration signal from output 124(4) is applied to the electrodes 118(2) (C+) and 120(2) (D−).

Accordingly, the application of the vibration signals from the outputs 124(1)-124(4) of full bridge drive circuits 122(1) and 122(2) as illustrated in FIG. 3 to the actuator system 102 as described above results in a two-dimensional trajectory in the shape of an elliptical orbit for the actuator system 102, although the actuator system 102 can be directed in other linear or shaped trajectories. As noted earlier, the vibration system 104 controls the direction in which the actuator system 102 rotates in this elliptical orbit path based on the value of the phase shift. The shallower portion of this elliptical orbit resulting from the semi-resonance in this bending mode of structure 103 enables the actuator system 102 to drive a moveable element in much more smaller and more precise steps.

Figure 6:
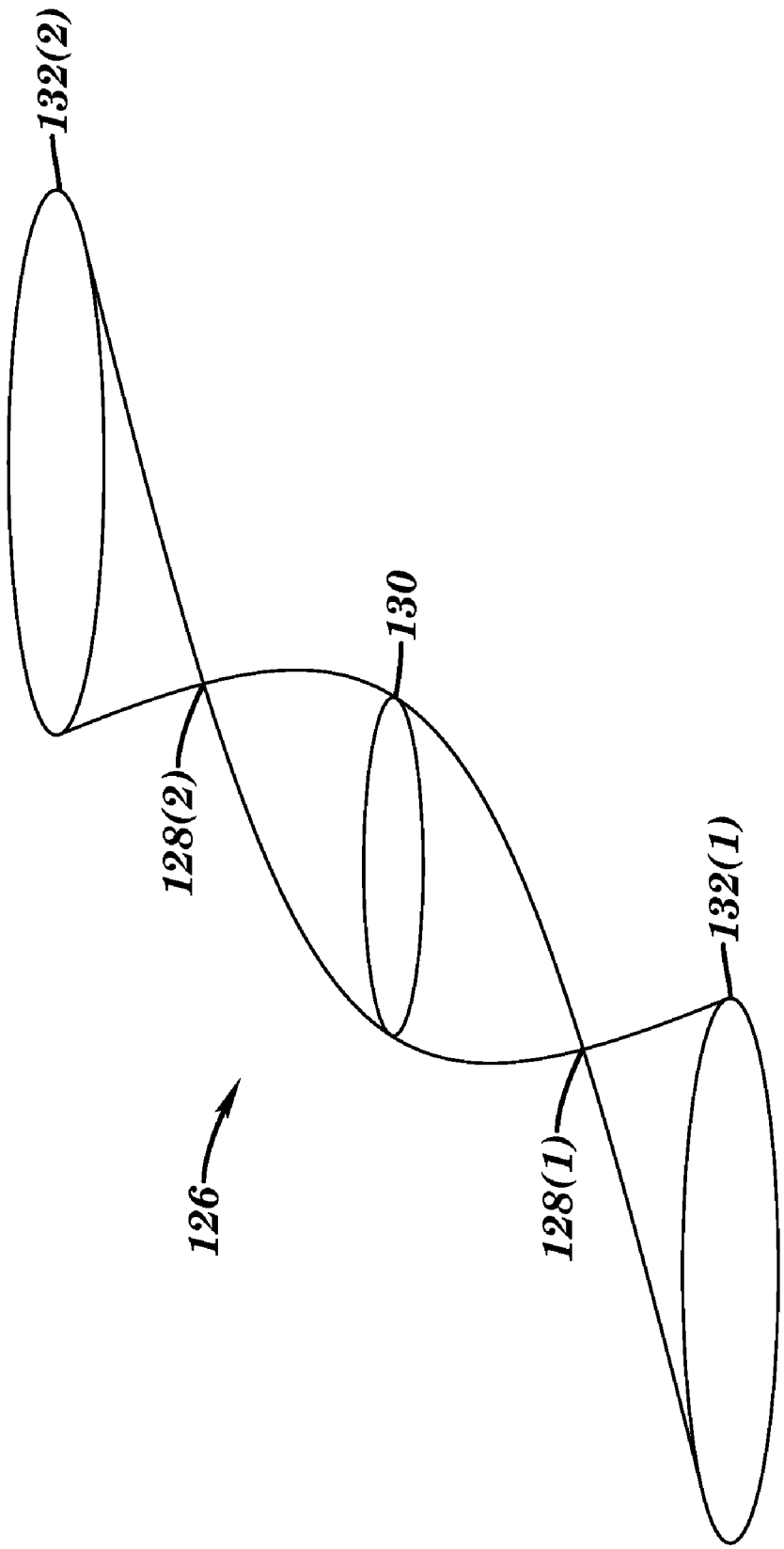
FIG. 6 is a diagram illustrating an exemplary elliptical orbit for the actuator system illustrated in FIG. 1A.

This elliptical orbit path for the actuator system 102 is illustrated in FIG. 6 and has two node points 128(1) and 128(2) and three anti-node points: mid, anti-node point 130; and end anti-node points 132(1) and 132(2). In this example, the mid, anti-node point 130 for the structure 103 is used to frictional couple to and drive a movable element in one of at least two directions although other points could be used, such as end anti-node points 132(1) and 132(2). By way of example only, embodiments of linear and circular motions system using the semi-resonant driving system 100 will now be described with reference to FIGS. 7A-10B.

Figure 7A:
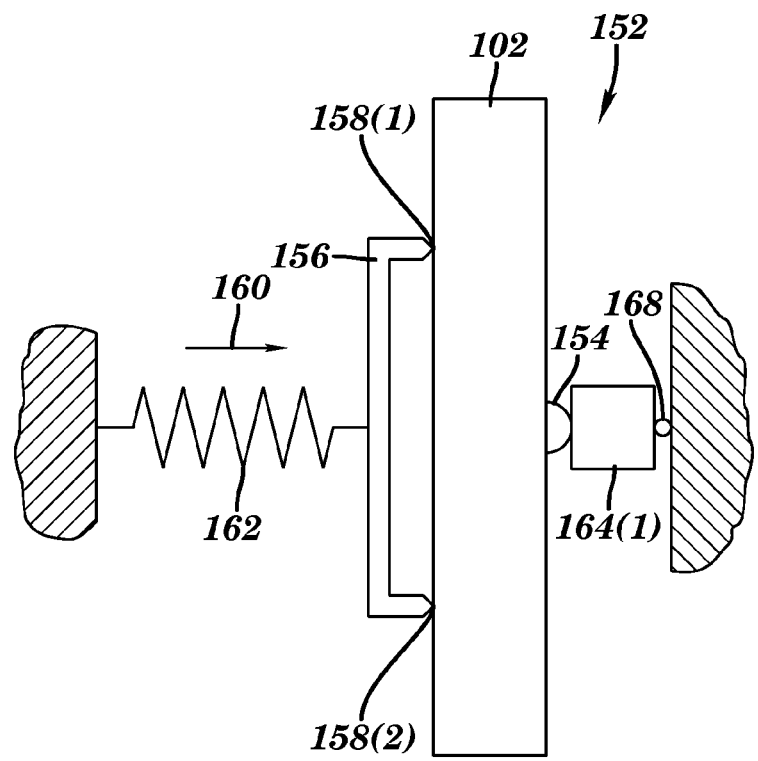
FIG. 7A is side view of a linear motion system using the semi-resonant driving system illustrated in FIG. 1A.
Figure 7B:
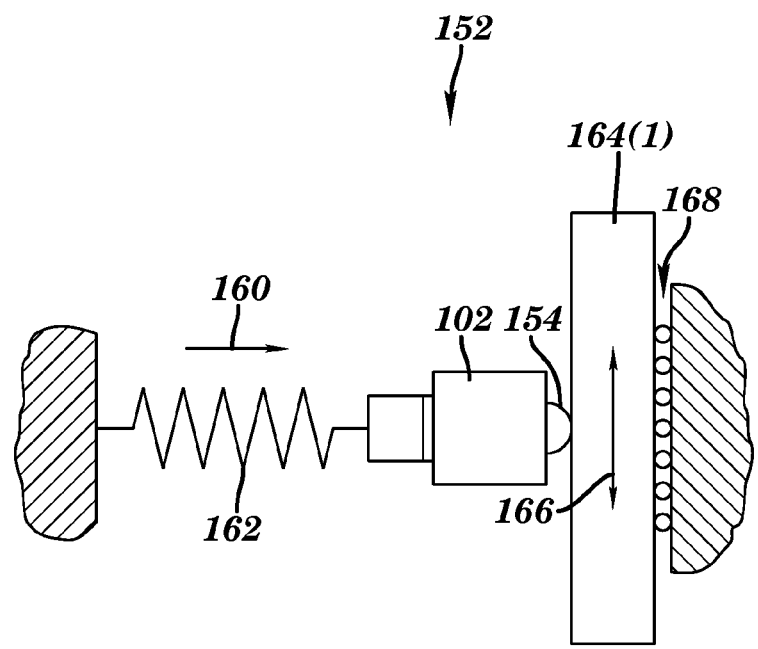
FIG. 7B is top view of the linear motion system using the semi-resonant driving system illustrated in FIG. 7A.

Referring more specifically to FIGS. 7A-7B, a linear motion system 152 using the semi-resonant driving system 100 is illustrated, although the linear motion system could use other types of driving systems, such as driving systems 200 and 300 by way of example only. The linear motion system 152 uses a middle contact pad 154 of the structure 103, at a middle anti-node point as described with reference to FIG. 6, to generate linear motion output. The structure 103 is secured by a bracket 156 at the two contact points 158(1) and 158(2) of the structure 103, at node points as described with reference to FIG. 6, with glue, although other types of adhesives, such as glue, or other securing systems can be used. A preload force 160 is applied to the bracket 156 through a spring type mechanism 162, although other types of biasing systems can be used. The contact pad 154 is at the middle point of the structure 103 and is preloaded against a slider 164(1) which is free to move in the direction 166 on a linear bearing 168. When the structure 103 operates in resonant or semi-resonant modes, the structure 103 has a two dimensional trajectory, such as a circular or elongated elliptical shape, which results in a net frictional force that pushes the slider 164(1) along the direction 166.

Although the slider 164(1) is restricted by the linear bearing 168 to only move freely in the direction 166, other configurations can be used. By way of example only, the linear bearing 168 could be replaced with a flexure guide system that lets the slider 164(1) move freely in the direction 166 and with minimum non-zero force in the direction 166, while still constraining other degrees of freedom of the slider 164(1).

Figure 8A:
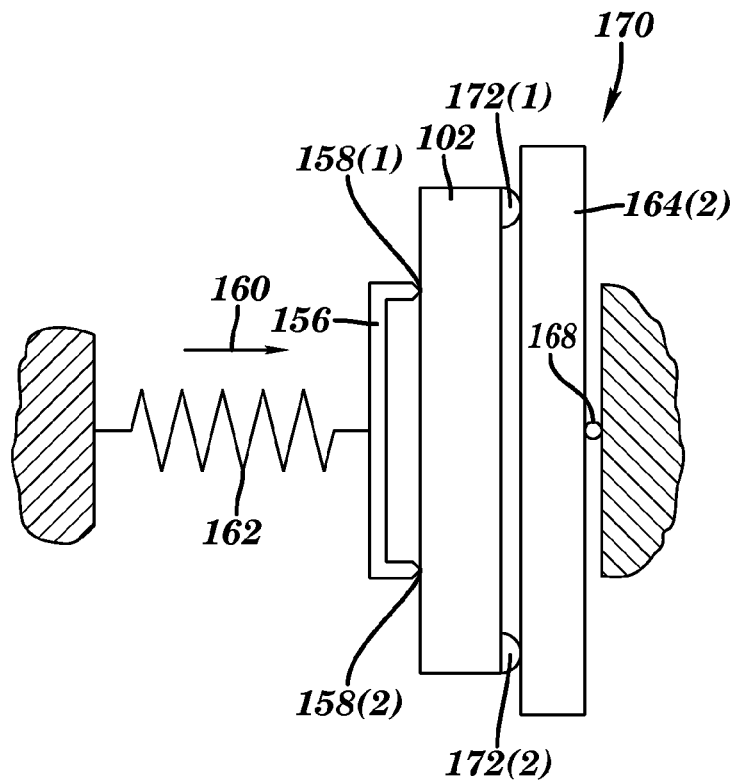
FIG. 8A is side view of another linear motion system using the semi-resonant driving system illustrated in FIG. 1A.
Figure 8B:
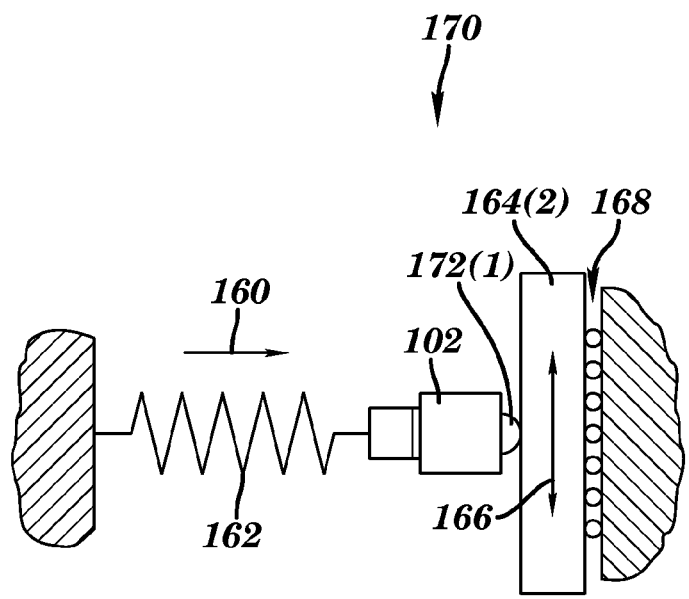
FIG. 8B is top view of the linear motion system using the semi-resonant driving system illustrated in FIG. 8A.

Referring to FIGS. 8A-8B, another linear motion system 170 using the semi-resonant driving system 100 is illustrated, although the linear motion system could use other types of driving systems, such as driving systems 200 and 300 by way of example only. Elements in linear motion system 170 which are like those in linear motion system 152 will have like reference numerals and will not be described again here. The linear motion system 170 is the same in structure and operation as the linear motion system 152, except as described and illustrated herein. The linear motion system 170 uses end contact pads 172(1) and 172(2) of the structure 103, at end anti-node point as described with reference to FIG. 6, to generate linear motion output. The contact pads 172(1) and 172(2) are at the end points of the structure 103 and are preloaded against another slider 164(2) which is free to move in the direction 166 on a linear bearing 168. When the structure 103 operates in resonant or semi-resonant modes, the structure 103 has a two dimensional trajectory, such as a circular or elongated elliptical shape, which results in a net frictional force that pushes the slider 164(2) along the direction 166. The two contact pads 172(1) and 172(2) will always act in phase because of the symmetry of the structure 103.

Although the slider 164(2) is restricted by the linear bearing 168 to only move freely in the direction 166, other configurations can be used. By way of example only, the linear bearing 168 could be replaced with a flexure guide system that lets the slider 164(2) move freely in the direction 166 and with minimum non-zero force in the direction 166, while still constraining other degrees of freedom of the slider 164(2).

Figure 9A:
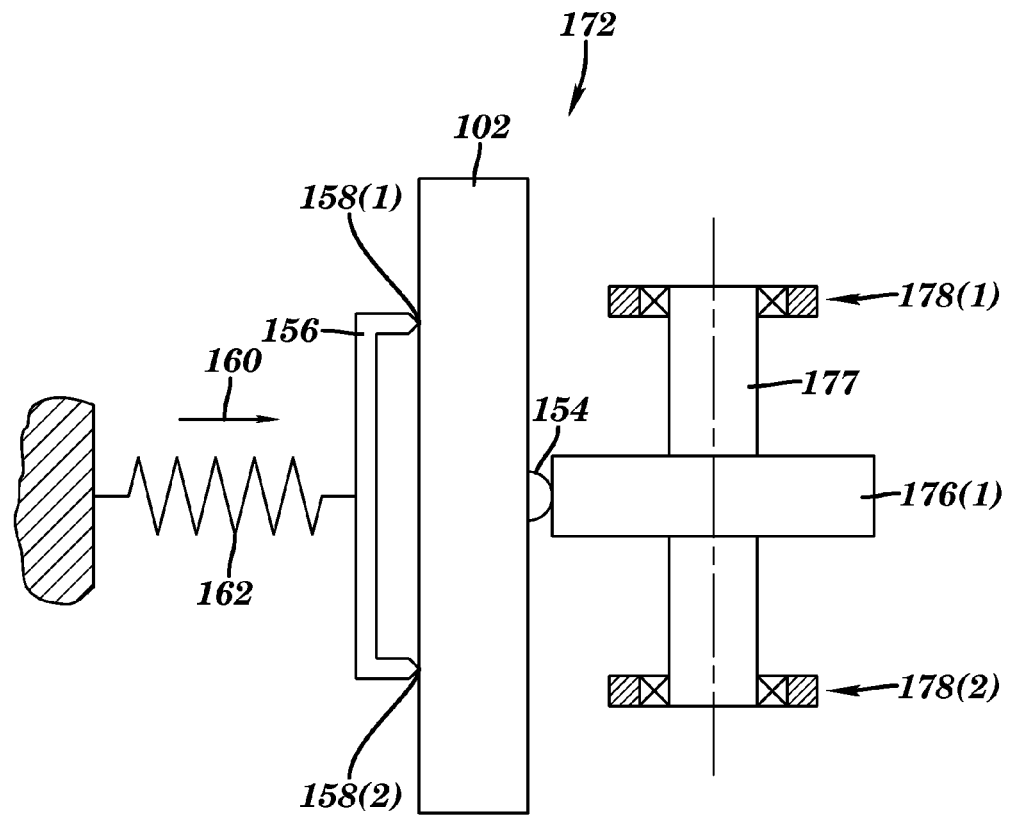
FIG. 9A is side view of a circular motion system using the semi-resonant driving system illustrated in FIG. 1A.
Figure 9B:
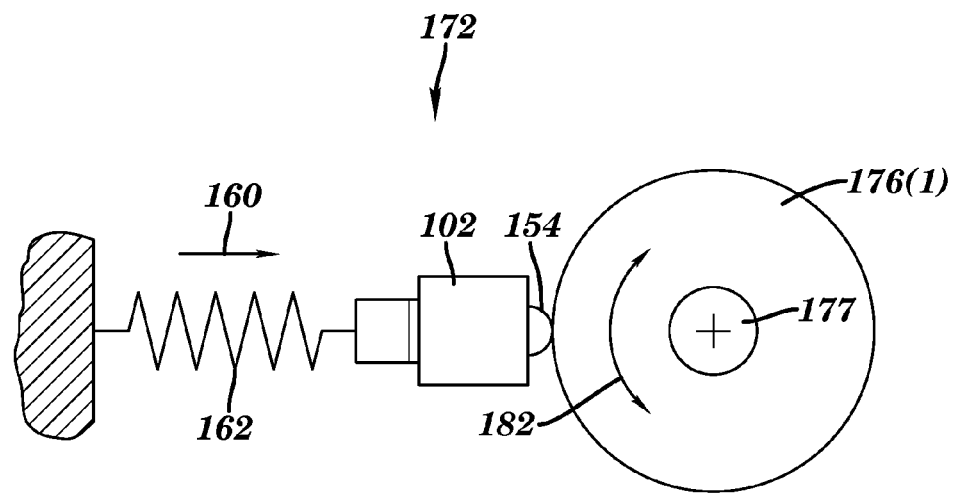
FIG. 9B is top view of the circular motion system using the semi-resonant driving system illustrated in FIG. 9A.

Referring to FIGS. 9A-9B, a circular motion system 172 using the semi-resonant driving system 100 is illustrated, although the circular motion system could use other types of driving systems. Elements in circular motion system 172 which are like those in linear motion system 152 will have like reference numerals and will not be described again here. The contact pad 154 is at the middle point of the structure 103 and is preloaded against a rotating wheel 176(1) on a shaft 177 which is rotatably seated on rotary bearing 178(1) and 178(2) at opposing ends. When the structure 103 operates in resonant or semi-resonant modes, the structure 103 has a two dimensional trajectory, such as a circular or elongated elliptical shape, which results in a net frictional force that pushes the wheel 176(1) along the direction 182 to rotate about the shaft 177.

Figure 10A:
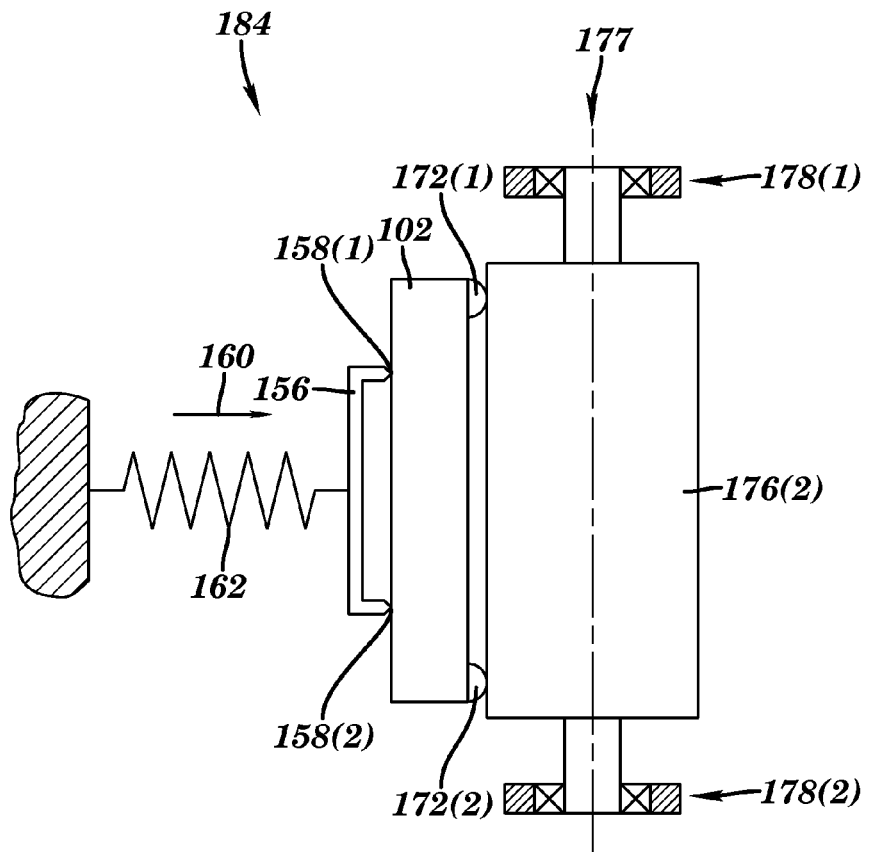
FIG. 10A is side view of another circular linear motion system using the semi-resonant driving system illustrated in FIG. 1A.
Figure 10B:
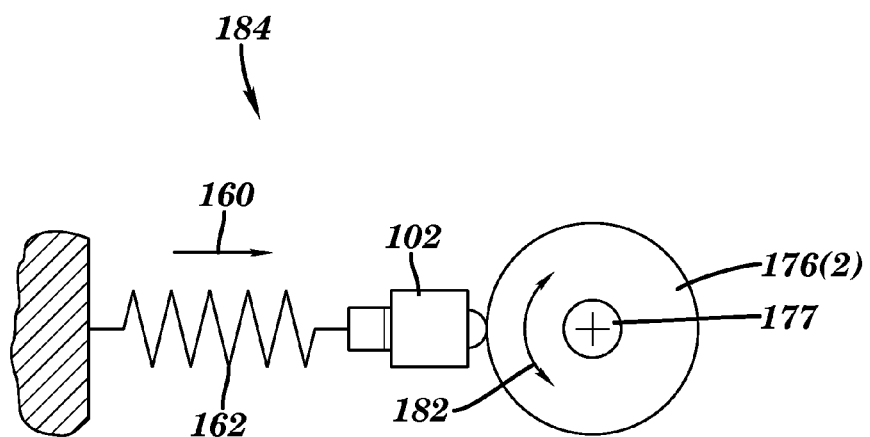
FIG. 10B is top view of the circular motion system using the semi-resonant driving system illustrated in FIG. 10A.

Referring to FIGS. 10A-10B, a circular motion system 184 using the semi-resonant driving system 100 is illustrated, although the circular motion system could use other types of driving systems. Elements in circular motion system 184 which are like those in circular motion system 172 will have like reference numerals and will not be described again here. The contact pads 172(1) and 172(2) are at the end points of the structure 103 and are preloaded against a rotating wheel 176 (2) on a shaft 177 which is rotatably seated on rotary bearing 178(1) and 178(2) at opposing ends. When the structure 103 operates in resonant or semi-resonant modes, the structure 103 has a two dimensional trajectory, such as a circular or elongated elliptical shape, which results in a net frictional force that pushes the wheel 176(2) along the direction 182 to rotate about the shaft 177.

Figure 11A:
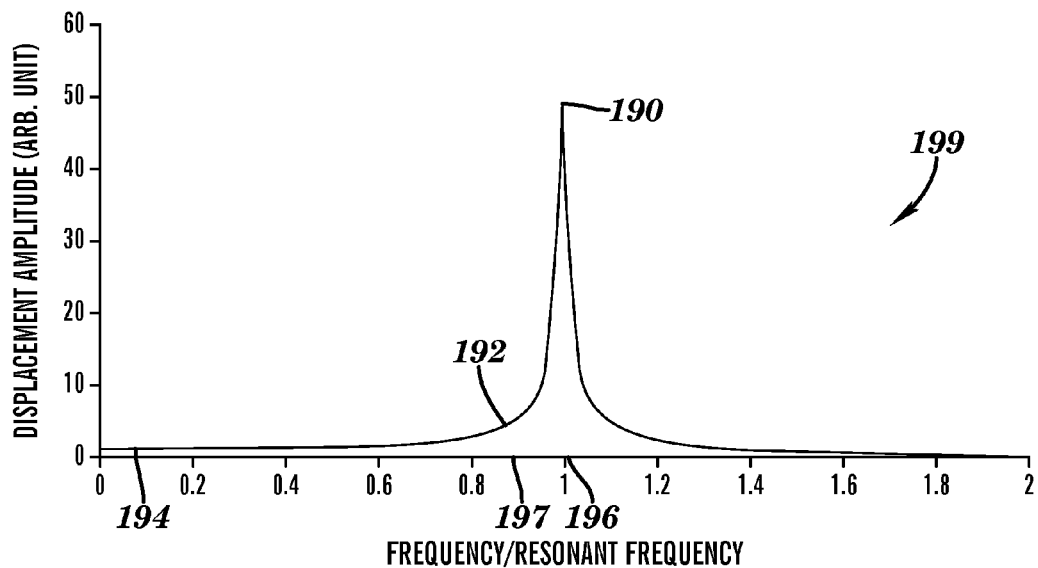
FIGS. 11A-11B are graphs illustrating an example of semi-resonance in accordance with embodiments of the present invention.
Figure 11B:
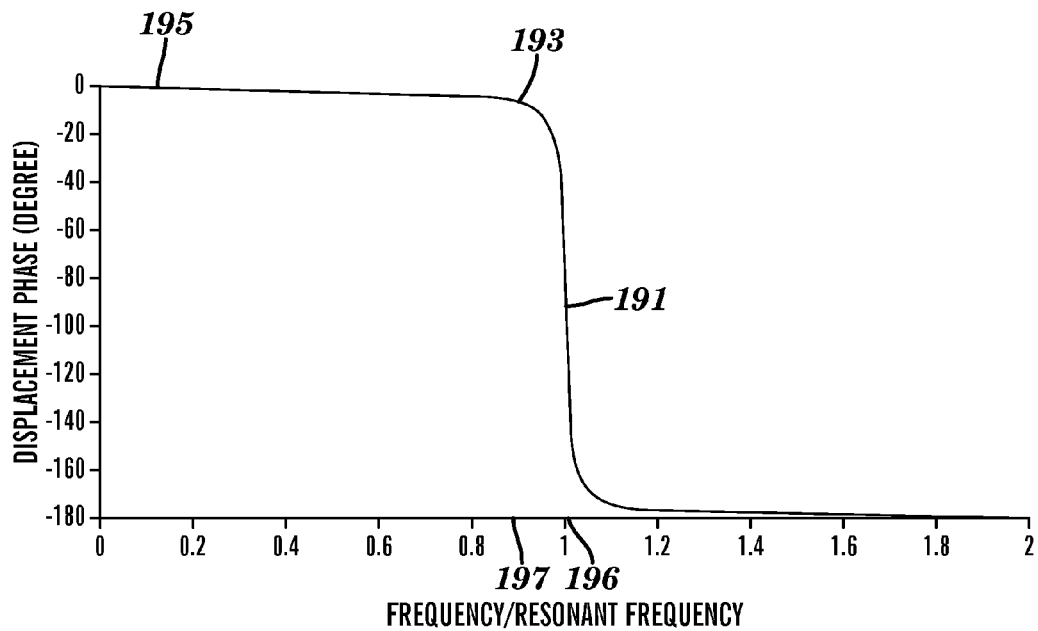

Referring to FIGS. 11A-11B, these graphs illustrate exemplary resonant displacement amplitude and displacement phase curves for mode 2 as a function of drive frequency (normalized by its resonant frequency). In this example, the resonant frequency 196 for mode 2 is 117 KHz and the mechanical quality factor Qm2 is 50. Additionally, in this example the actuator system 102 is driven at 105 KHz (mode 1 resonant frequency), point 197, where the relative frequency is 105/117~0.9. Further, the amplitude 192 at point 197 is about five times the amplitude at DC level or at very low frequency at point 194. The amplitude 192 for mode 2 (the vibration that actually drive the intended motion) is somewhat amplified. In contrast, the amplitude for mode 1 is fully amplified because it is operated at its resonant frequency.

For the semi-resonant driving system 100, due to the relatively high mechanical quality factor Qm2, the phase shift 193 between the displacement and voltage signal for mode 2 is close to 0° (close to phase at DC level 195). In addition, there is a −90° mechanical phase shift 191 between the displacement and voltage signal for mode 1 because it is operating at its own resonant frequency. Thus, the phase different for the electrical drive signals for mode 1 and mode 2 are about 0 or 180 degrees to achieve an optimized elliptical orbit for forward or reverse motion as illustrated in FIG. 6. In operation of the semi-resonant driving system 100 as illustrated and described herein, the voltage phase difference angle between mode 1 and mode 2 is typically adjusted to be slightly offset from 0 or 180 degree for optimum performance because the quality factors and resonant frequencies for both phases have an effect on the optimized phase difference.

There are several advantages to using the semi-resonant driving system 100. For example, the semi-resonant driving system 100 overcomes the inconsistent motion of prior art ultrasonic motor systems. When the mode 1 motion is fully amplified by Qm1 in the present invention, the actuator system 102 generates sufficient normal force differential and sufficient push force to overcome contact surface non-uniformity, system compliance, and other disturbances, which can affect the motion in the drive direction. The mode 2 motion has less amplification (e.g., by a few times), rather than Qm2 (e.g., 50 to 100). In this example, the phase 2 motion is along the actuation direction and produces 100 nm steps, which is about five times DC motion of 20 nm. For a 105 KHz operation, the theoretical speed is about 10 mm/s, and the practical speed is a few mm/s due to frictional losses. The semi-resonant driving system 100 can be used for auto-zoom and auto-focus applications which have lower speed and high precision requirements.

Additionally, the semi-resonant driving system 100 is less susceptible to resonant frequency drift in mode 2, due to for example manufacturing tolerances and environmental changes. For prior art systems, the matching of the resonant frequencies for mode 1 and mode 2 is critical for motor performance. When both modes has high Qms, a slight mismatch in their resonant frequencies can cause significant loss of motor push force and speed. In contrast, the semi-resonant driving system 100 is operated at the resonant frequency of mode 1 and semi-resonant for mode 2, the vibration amplitude and phase for mode 2 is not drastically changed. The resulting motor performance (i.e., speed and push force) is more stable and not sensitive to manufacturing tolerances and environmental changes. As a result, the semi-resonant driving system 100 is less susceptible to resonant frequency shift from mode 2.

Referring to FIGS. 12A-16C, a semi-resonant driving system 200 in accordance with other embodiments of the present invention is illustrated. The semi-resonant driving system 200 is the same in structure and operation as the semi-resonant driving system 100, except as described and illustrated herein. Elements in semi-resonant driving system 200 which are like those in semi-resonant driving system 100 will have like reference numerals and will not be described again here.

Figures 12A, 12B:
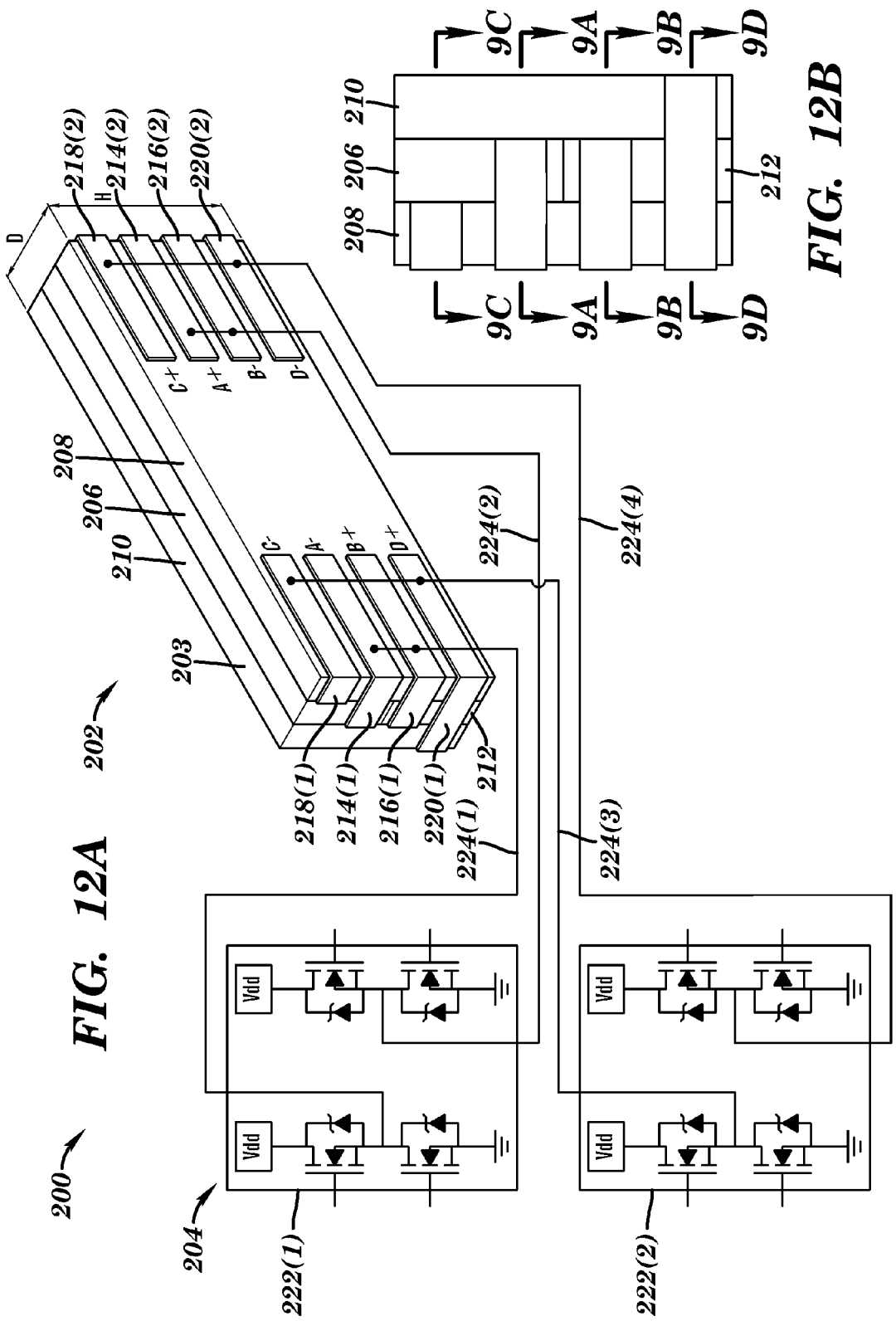
FIG. 12A is partial perspective view of an actuator system and a partial schematic diagram of a vibration system for another semi-resonant driving system in accordance with embodiments of the present invention.
FIG. 12B is a right end view of the actuator system illustrated in FIG. 12A.

Referring more specifically to FIGS. 12A and 12B, the actuator system 202 generates a two-dimensional trajectory to frictionally couple to and drive a moveable load, such as an optical lens by way of example only, in either of at least two opposing directions, although the actuator system 202 can generate other types of trajectories, be coupled in other manners and at other locations, and move other types of loads in other directions. The actuator system 202 includes an asymmetrical, elongated structure 203, although the actuator system 202 can comprise other types of structures with other shapes and symmetries. The elongated structure 203 has a depth D with a bending mode having a first resonant frequency "fres1" and a height H with a bending mode having a second resonant frequency "fres2." The height H is generally greater than the depth D so the second resonant frequency "fres2" is higher than first resonant frequency "fres1." Other factors that affect resonance frequency include material stiffness, mass, and location and orientation of internal electrodes.

Referring to FIGS. 13A-13D, the elongated structure 203 comprises a plurality of parallel piezoelectric layers that are co-fired together, although the elongated structure 203 could comprises other types and numbers of layers, such as a single layer, other types and numbers of regions, and other manufacturing processes can be used. Each of the piezoelectric layers for the elongated structure 203 is about fourteen micrometers thick, although other thicknesses can be used for each of the layers, such as a thickness between five micrometers to forty micrometers. By using the plurality of piezoelectric layers for elongated structure 203 a lower applied voltage can be used, than is possible when a single piezoelectric layer is used for the elongated structure 103.

Referring back to FIG. 12A, the elongated structure 203 includes four piezoelectric regions 206, 208, 210, and 212 and electrodes 214(1) and 214(2), electrodes 216(1) and 216 (2), electrodes 218(1) and 218(2), and electrodes 220(1) and 220(2), although the structure can comprise other numbers and types of structures with other numbers and types of regions and connectors. By way of example only, in alternative embodiments one of the two piezoelectric regions 206 and 212 and one of the piezoelectric regions 208 and 210, could be inactive which would reduce the drive amplitude, but otherwise would not alter the operation of the actuator system, although other combinations of active and inactive regions could be used.

The piezoelectric regions 206, 208, 210, and 212 are poled to have specific positive and negative electrodes during manufacturing although the piezoelectric regions can be formed in other manners. More specifically, the piezoelectric regions 206, 208, 210, and 212 are poled during manufacturing so that "L" shaped electrodes have the following polarity: for piezoelectric region 206, electrode 214(1) is negative (A−) and electrode 214(2) is positive (A+), for piezoelectric region 212, electrode 216(1) is positive (B+) and electrode 216(2) is negative (B−), for piezoelectric region 208, electrode 218(1) is negative (C−) and electrode 218(2) is positive (C+), and for piezoelectric region 210, electrode 220(1) is positive (D+) and electrode 220(2) is negative (D−). In the elongated structure 203, the piezoelectric regions 206 and 212 are located adjacent each other and between outer piezoelectric regions 208 and 210 as illustrated, although the structure could have other numbers of piezoelectric regions in other configurations.

Figure 13A:
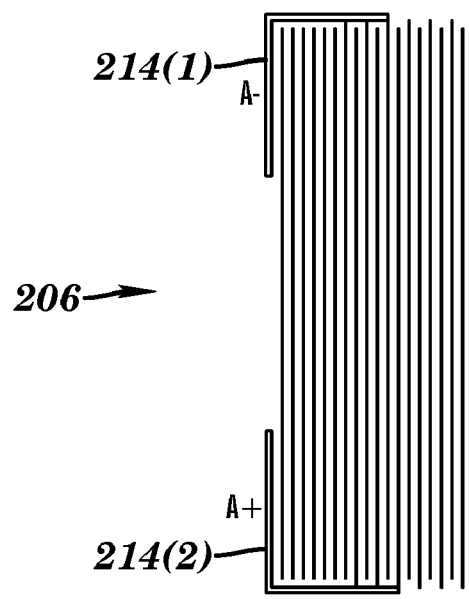
FIG. 13A is a cross-sectional, top view of the actuator system taken along lines through 13A-13A in FIG. 12B.
Figure 13C:
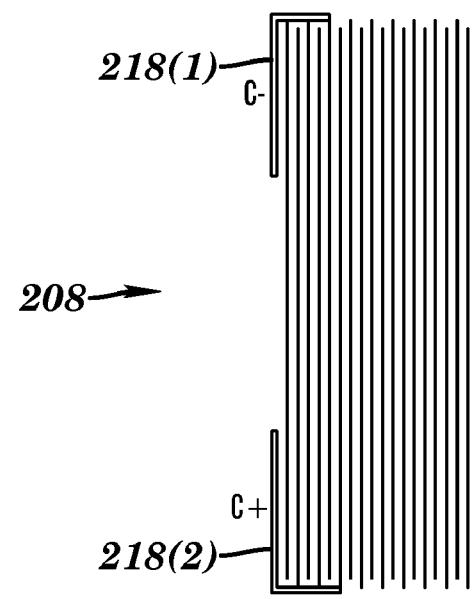
FIG. 13C is a cross-sectional, top view of the actuator system taken along lines through 13C-13C in FIG. 12B.
Figure 13B:
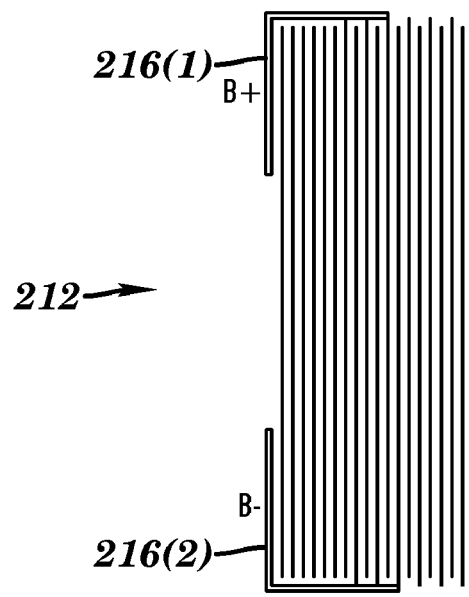
FIG. 13B is a cross-sectional, top view of the actuator system taken along lines through 13B-13B in FIG. 12B.
Figure 13D:
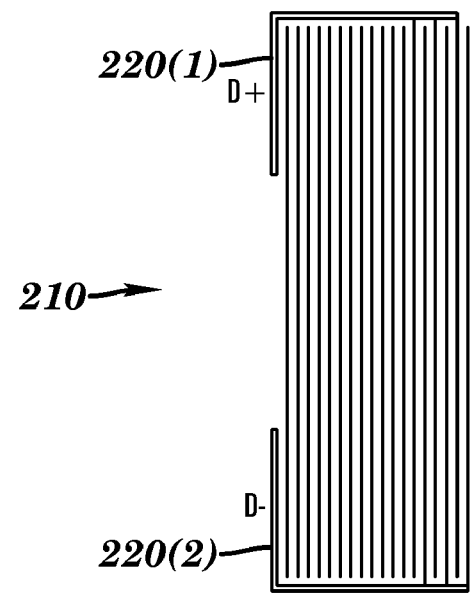
FIG. 13D is a cross-sectional, top view of the actuator system taken along lines through 13D-13D in FIG. 12B.

Referring to FIGS. 12A, 12B, and 13A, the electrode 214(1) is coupled to and interleaved to be connected to one internal electrode of each of the piezoelectric layers for piezoelectric region 206 and electrode 214(2) is interleaved to be connected to the opposing internal electrode of each of the piezoelectric layers for region 206, although other types and numbers of connections at other locations can be used. Referring to FIGS. 12A, 12B, and 13B, the electrode 216(1) is coupled to and interleaved to be connected to one internal electrode of each of the piezoelectric layers for piezoelectric region 212 and electrode 216(2) is interleaved to be connected to the opposing internal electrode of each of the piezoelectric layers for the piezoelectric region 212, although other types and numbers of connections at other locations can be used. Referring to FIGS. 12A, 12B, and 13C, the electrode 218(1) is coupled to and interleaved to be connected to one internal electrode of each of the piezoelectric layers for piezoelectric region 208 and electrode 218(2) is interleaved to be connected to the opposing internal electrode of each of the piezoelectric layers for piezoelectric region 208, although other types and numbers of connections at other locations can be used. Referring to FIGS. 12A, 12B, and 13D, the electrode 220(1) is coupled to and interleaved to be connected to one internal electrode of each of the piezoelectric layers for piezoelectric region 210 and electrode 220(2) is interleaved to be connected to the opposing internal electrode of each of the piezoelectric layers for piezoelectric region 220, although other types and numbers of connections at other locations can be used.

Referring back to FIG. 12A, the vibration system 204 comprises a pair of full bridge drive circuits 222(1) and 222(2) each of which are coupled to a voltage source $V_{dd}$ and have four outputs 224(1)-224(4) which provide the ultrasonic, square wave vibration signals illustrated in FIG. 14 by way of example only, although other types and numbers of driving circuits and systems, such as a half bridge circuit system by way of example only, with other number of outputs which provide other types of signals, such as sinusoidal shaped-signals by way of example only, can be used. The output 224(1) from full bridge drive circuit 222(1) is coupled to electrodes 214(1) and 216(1), the output 224(2) from full bridge drive circuit 222(1) is coupled to electrodes 214(2) and 216(2), the output 224(3) from full bridge drive circuit 222(2) is coupled to electrodes 218(1) and 220(1), and the output 224(4) from full bridge drive circuit 222(2) is coupled to electrodes 218(2) and 220(2), although other types and numbers of connections could be used. One of the advantages of the vibration system 204 with the full bridge drive circuits 222(1) and 222(2) is the effective voltage differential across the opposite electrode and negative electrode of each of the piezoelectric regions 206, 208, 210, and 212 and is twice the supply voltage $V_{dd}$ and effectively doubles the mechanical output compared with a half bridge circuit with the same supply voltage $V_{dd}$, which saves space, although other types of systems could be used. Since the components and operation of full bridge circuits are well known to those of ordinary skill in the art they will not be described in greater detail herein.

The operation of the semi-resonant driving system 200 will now be described with reference to FIGS. 6-16C. The elongated structure 203 has two bending modes, mode1 and mode2, which each have a different resonant frequency. The vibration amplitude in either of these bending modes is dependent on the vibration frequency of the applied signals. When the vibration system 204 applies vibration signals at the resonant frequency for one of the bending modes, such as the frequency "fres1" of mode1 to both bending modes of the structure 203, the vibration amplitude is fully amplified for the bending mode operating at its resonant frequency and is only partially amplified for the other bending mode which is operating at partial resonance. When the vibration system 204 applies signals at the resonant frequency "fres2" for the other one of the bending modes, such as the frequency of mode2, to both bending modes of the structure 203, the vibration amplitude is fully amplified for the bending mode operating at its resonant frequency and is only partially amplified for the other bending mode which is operating at partial resonance.

By way of example only, four vibration signals from outputs 224(1)-224(4) of the full bridge drive circuits 222(1) and 222(2) are illustrated in FIG. 14. In this example, $V_{dd}$ is 2.8 volts. In this example, the four vibration signals provide from the outputs 224(1)-224(4) each have a vibration frequency substantially the same as the resonant frequency of one of the two bending modes of the structure 203. Additionally, the vibration signals from outputs 224(1)-224(2) are phase shifted by the vibration system 204 with respect to the vibration signals from outputs 224(3)-224(4) between about 0 degrees to 90 degrees for moving the movable member in one of the two directions, although other ranges for the phase shift can be used. Additionally, the vibration system 204 adjusts the direction of the phase shift to between about −180 degrees to −90 degrees for moving the movable member in the opposite direction between outputs 224(1)-224(2) and outputs 224(3)-224(4), although other ranges for the phase shift can be used.

Figure 15A:
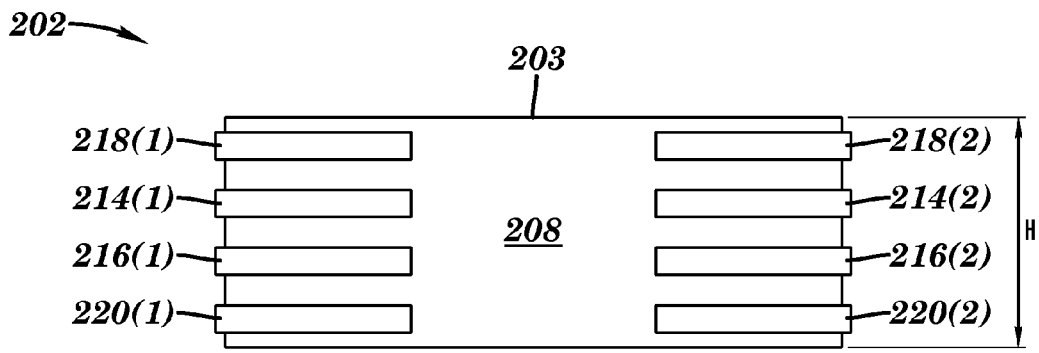
FIGS. 15A-15C are front views of the actuator system for the semi-resonant driving system illustrated in FIG. 12A in operation.
Figure 15B:
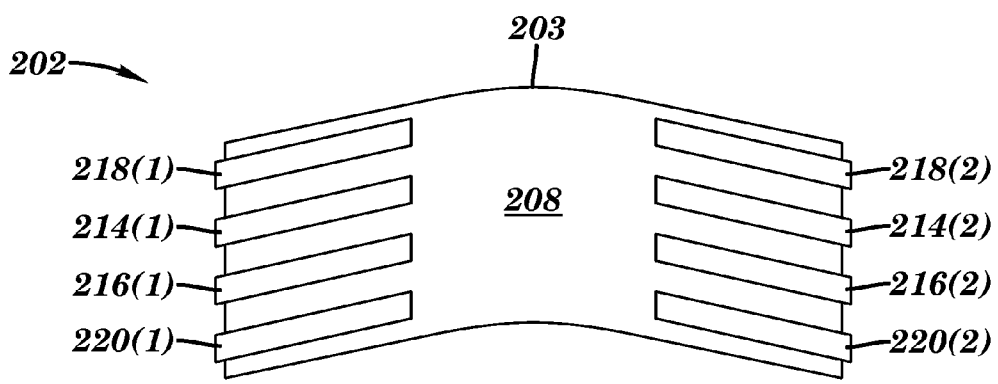
Figure 15C:
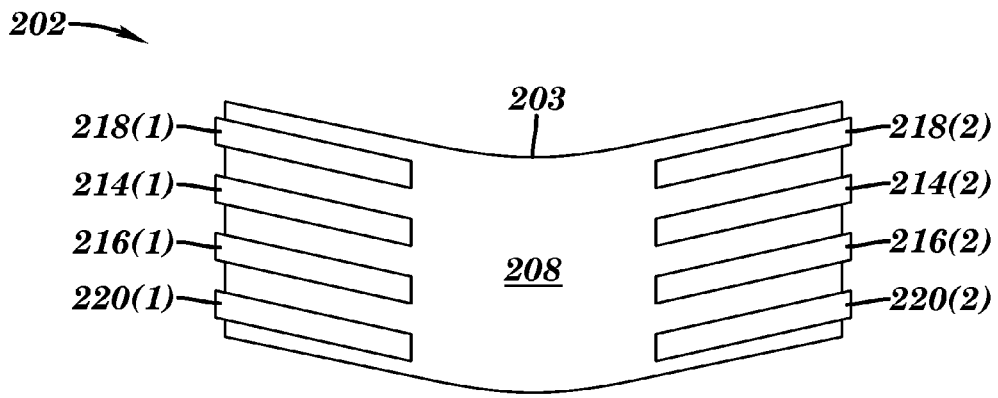
Figure 19:
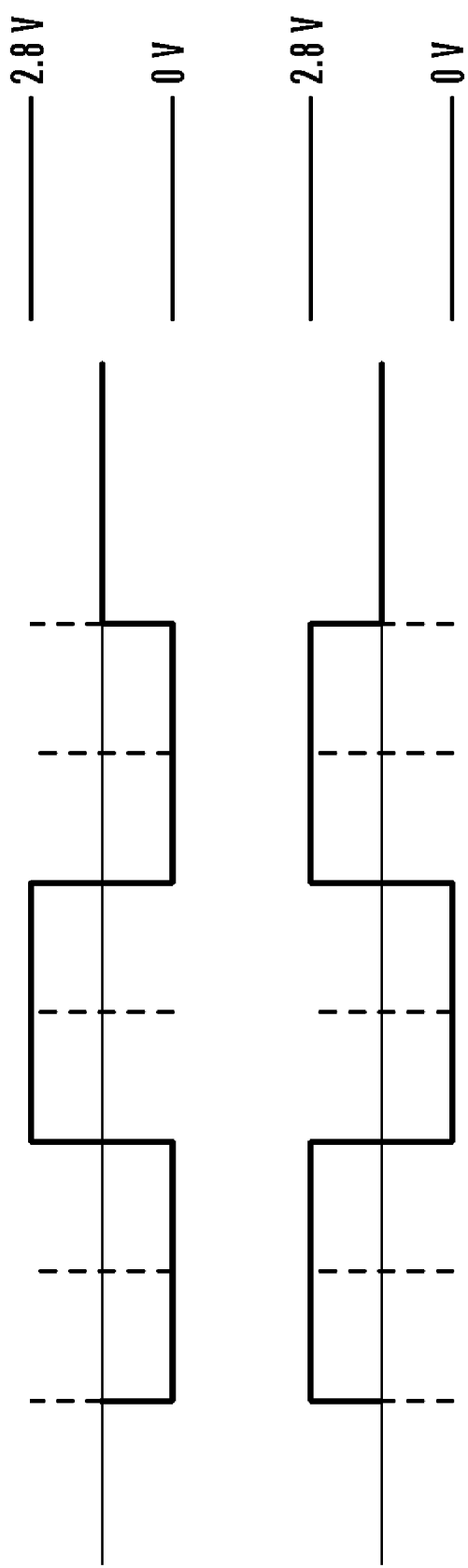
FIG. 19 is a diagram of an example of signals applied by the vibration system to the actuator system illustrated in FIG. 12A.

Referring to FIGS. 14 and 15A-15C, the motion of the structure 203 in one of the bending modes resulting from the application of the vibration signals from outputs 224(1)-224(2) at different stages to the opposite polarity piezoelectric regions 206 and 212 are illustrated. FIG. 15(A) is when the structure 203 is at rest (voltages to all electrodes are zero). When the voltage difference between outputs 224(1) and 224(2) is positive, as shown in stage 242 in FIG. 14, region 206 increases in length and region 212 decreases in length, which causes the structure 203 to bend as shown in FIG. 15(b). When the voltage difference between outputs 224(1) and 224(2) is negative, as shown in stage 240 or 244 in FIG. 14, region 206 decreases in length and region 212 increases in length, which causes the structure 203 to bend as shown in FIG. 15(c). Vibration signal from output 224(1) is applied to the electrodes 214(1) (A−) and 216(1) (B+) and the vibration signal from output 224(2) is applied to the electrodes 214(2) (A+) and 216(2) (B−).

Referring to FIGS. 14 and 16A-16C, the motion of the structure 203 in the other one of the bending modes resulting from the application of the vibration signals from outputs 224(3)-224(4) at different stages to the opposite polarity piezoelectric regions 208 and 210 are illustrated. FIG. 16(A) is when the structure 203 is at rest (voltages to all electrodes are zero). When the voltage difference between outputs 224 (3) and 224(4) is positive, as shown in stage 246 or 250 in FIG. 14, region 208 increases in length and region 210 decreases in length, which causes the structure 203 to bend as shown in FIG. 16(c). When the voltage difference between outputs 224(3) and 224(4) is negative, as shown in stage 248 in FIG. 14, region 208 decreases in length and region 210 increases in length, which causes the structure 203 to bend as shown in FIG. 16(b). The vibration signal from output 224(3) is applied to the electrodes 218(1) (C−) and 220(1) (D+) and the vibration signal from output 224(4) is applied to the electrodes 218(2) (C+) and 220(2) (D−).

Accordingly, the application of the vibration signals from the outputs 224(1)-224(4) of full bridge drive circuits 222(1) and 222(2) as illustrated in FIG. 14 to the actuator system 202 as described above results in a two-dimensional trajectory in the shape of an elliptical orbit for the actuator system 202, although the actuator system 202 can be directed in other linear or shaped trajectories. As noted earlier, the vibration system 204 controls the direction in which the actuator system 202 rotates in this elliptical orbit path based on the value of the phase shift. The shallower portion of this elliptical orbit resulting from the semi-resonance in this bending mode of structure 203 enables the actuator system 202 to drive a moveable element in much more smaller and more precise steps.

This elliptical orbit path for the actuator system 202 is the same as that illustrated in FIG. 6 for actuator system 102 and has two node points 128(1) and 128(2) and three anti-node points: mid, anti-node point 130; and end anti-node points 132(1) and 132(2). In this example, the mid, anti-node point 130 for the structure 203 also is used to frictional couple to and drive a movable element in one of at least two directions, although other points could be used, such as end anti-node points 132(1) and 132(2). Additionally, since the embodiments of linear and circular motions system using the semi-resonant driving system 100 described with reference to FIGS. 8A-11B are the same for semi-resonant driving system 200, they will not be described again.

Referring to FIGS. 17A-21B, a semi-resonant driving system 300 in accordance with other embodiments of the present invention is illustrated. The semi-resonant driving system 300 is the same in structure and operation as the semi-resonant driving system 100, except as described and illustrated herein. Elements in semi-resonant driving system 300 which are like those in semi-resonant driving system 100 will have like reference numerals and will not be described again here.

Figure 20A:
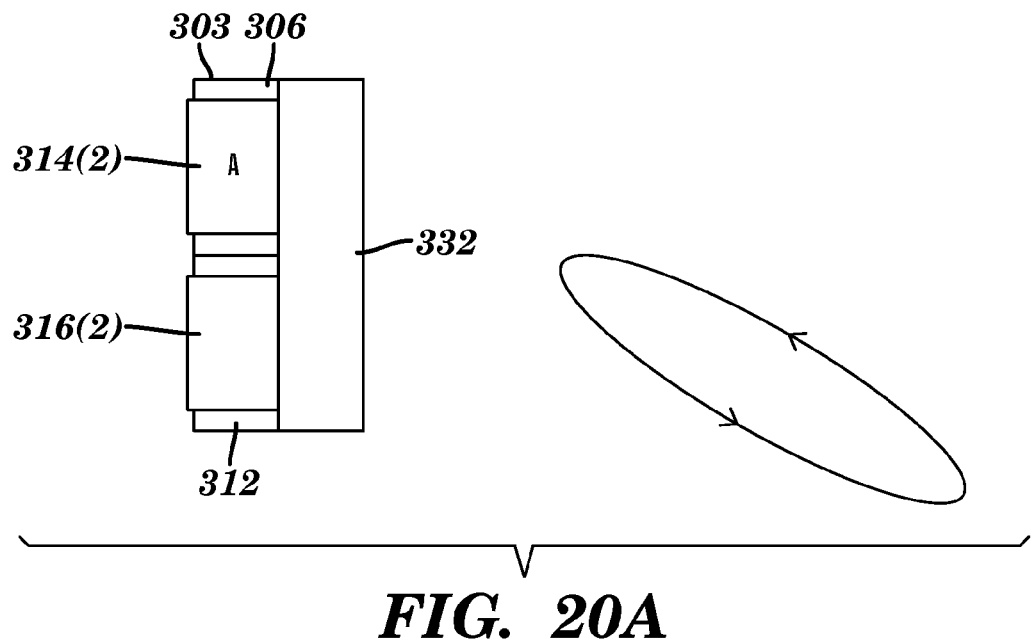
FIGS. 20A-20B are diagram of examples of elliptical paths for the actuator system shown in FIG. 17A.
Figure 20B:
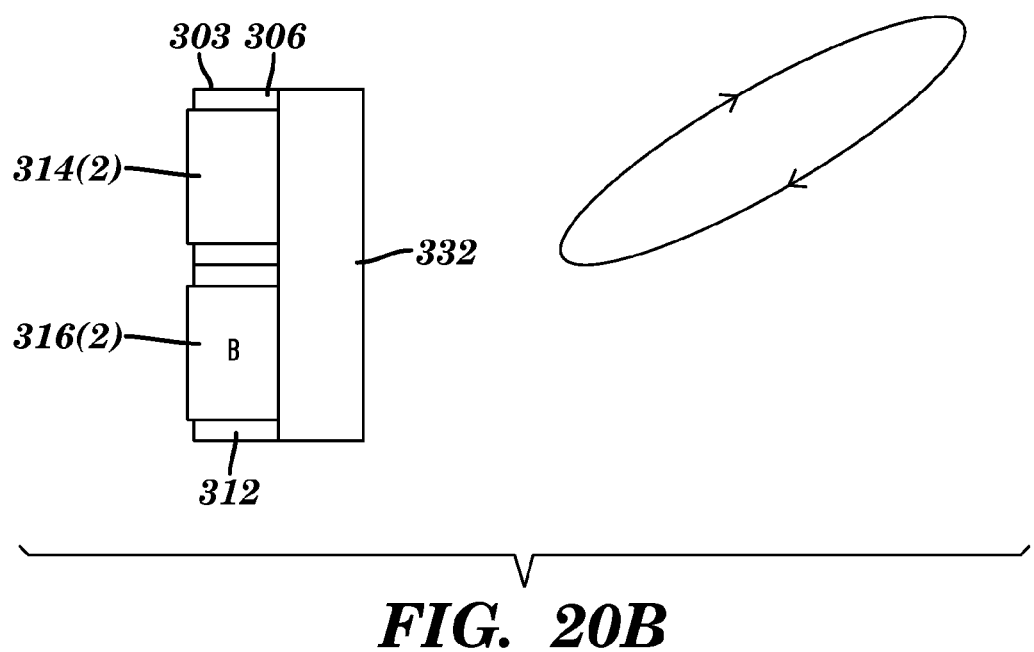
Figure 21A:
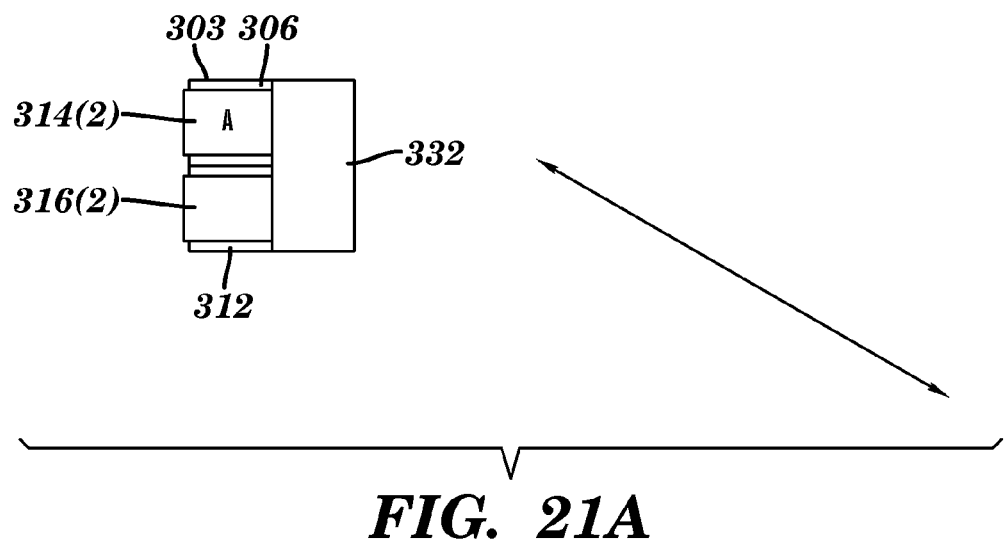
FIGS. 21A-21B are diagram of examples of linear paths for the actuator system shown in FIG. 17A.
Figure 21B:
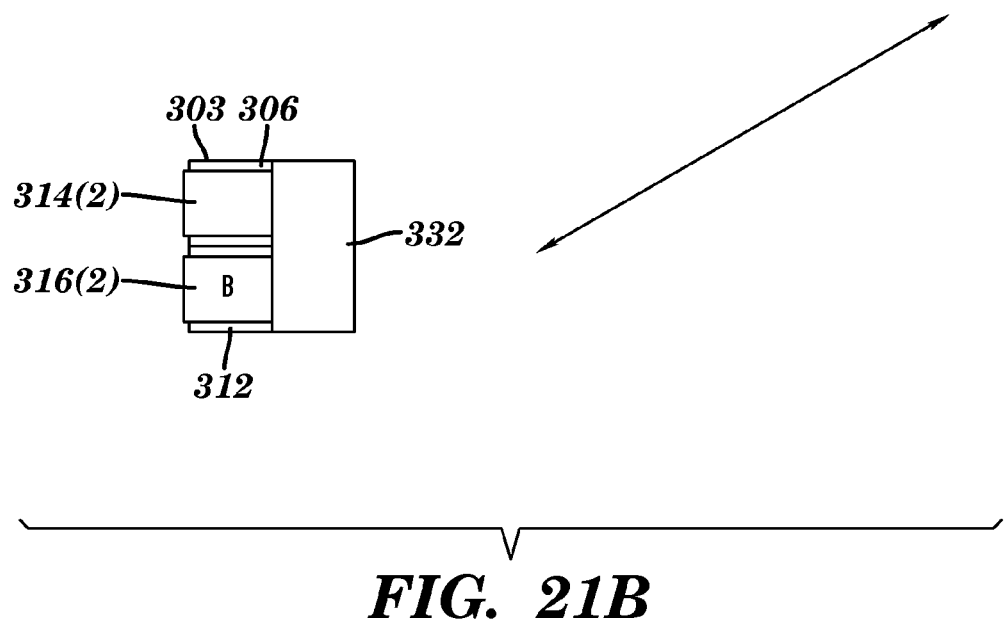

Referring more specifically to FIGS. 17A and 17B, the actuator system 302 generates a two-dimensional trajectory to frictionally couple to and drive a moveable load, such as an optical lens by way of example only, in either of at least two opposing directions, although the actuator system 302 can generate other types of trajectories, be coupled in other manners and at other locations, and move other types of loads in other directions. By way of example only, the actuator system 302 can generate an elliptical trajectory as illustrated in FIGS. 20A-20B and a linear trajectory as illustrated in FIGS. 21A-21B. The actuator system 302 includes an asymmetrical, elongated structure 303, although the actuator system 302 can comprise other types of structures with other shapes and symmetries. The elongated structure 303 has a depth D with a bending mode having a first resonant frequency "fres1" and a height H with a bending mode having a second resonant frequency "fres2." The height H is generally greater than the depth D so the second resonant frequency "fres2" is higher than first resonant frequency "fres1." Other factors that affect resonance frequency include material stiffness, mass, and location and orientation of internal electrodes.

Referring to FIGS. 18A-18D, the elongated structure 303 comprises a plurality of parallel piezoelectric layers that are co-fired together with an inactive layer 332 with no electrodes, although the elongated structure 303 could comprises other types and numbers of layers, other types and numbers of regions, and other manufacturing processes can be used. Each of the piezoelectric layers for the elongated structure 303 is about fourteen micrometers thick, although other thicknesses can be used for each of the layers, such as a thickness between five micrometers to forty micrometers. By using the plurality of piezoelectric layers for elongated structure 303 a lower applied voltage can be used, than is possible when a single piezoelectric layer is used.

Referring back to FIG. 17A, the elongated structure 103 includes two piezoelectric regions 306 and 312, the inactive layer 332, electrodes 314(1) and 314(2), and electrodes 316 (1) and 316(2), although the structure can comprise other numbers and types of structures with other numbers and types of regions and connectors.

The piezoelectric regions 306 and 312 are poled to have a polarity and to have specific positive and negative "L" shaped electrodes during manufacturing although the piezoelectric regions can be formed in other manners. More specifically, during manufacturing piezoelectric region 306 is poled to have electrode 314(1) to be negative (A−) and electrode 314 (2) to be positive (A+). Additionally, piezoelectric region 312 is poled to have electrode 316(1) to be positive (B+) and electrode 316(2) to be negative (B−). In the elongated structure 103, the piezoelectric regions 306 and 312 are located adjacent each other and both are adjacent inactive layer 332, although the structure could have other configurations.

Referring to FIGS. 17A, 17B, and 18A, the electrode 314 (1) is coupled to and interleaved to be connected to one internal electrode of each of the piezoelectric layers for the piezoelectric region 306 and electrode 314(2) is interleaved to be connected to the opposing internal electrode of each of the piezoelectric layers for piezoelectric region 306, although other types and numbers of connections at other locations can be used. Referring to FIGS. 17A, 17B, and 18B, the electrode 316(1) is coupled to and interleaved to be connected to one internal electrode of each of the piezoelectric layers for the piezoelectric region 312 and electrode 316(2) is interleaved to be connected to the opposing internal electrode of each of the piezoelectric layers for the piezoelectric region 312, although other types and numbers of connections at other locations can be used.

Referring back to FIG. 17A, the vibration system 304 comprises a full bridge drive circuit 322 and a pair of switches 330(1) and 330(2), although the vibration system 304 could comprise other numbers and types of systems, devices, and components. The full bridge drive circuit 322 is coupled to a voltage source $V_{dd}$ and has an output 324(1) coupled to switch 330(1) and an output 324(2) coupled to switch 330(2). The movement of the switches 330(1) and 330(2) is controlled by a control system 331 which also controls the phase shift of the two orthogonal mode vibrations in the structure, although other types of control system could be used. The full bridge drive circuit 322 provides the ultrasonic, square wave vibration signals illustrated in FIG. 19 by way of example only, although other types and numbers of driving circuits and systems, such as a half bridge circuit system by way of example only, with other number of outputs which provide other types of signals, such as sinusoidal shaped-signals by way of example only, can be used. In this example, $V_{dd}$ is 2.8 volts. The output 324(1) from full bridge drive circuit 322 is coupled to either electrodes 314(1) or electrode 316(1) depending on the position of switch 330(1) and the output 324(2) from full bridge drive circuit 322 is coupled to either electrodes 314(2) or electrode 316(2) depending on the position of switch 330(1), although other types and numbers of connections could be used. When switch 330(1) couples the vibration signal on output 324(1) to the electrode 314(1), the switch 330(2) couples the vibration signal on output 324(2) to the electrode 314(2). Additionally, when switch 330(1) couples the vibration signal on output 324(1) to the electrode 316(1), the switch 330(2) couples the vibration signal on output 324(2) to the electrode 316(2), although other switching patterns can be used. Since the components and operation of full bridge circuits are well known to those of ordinary skill in the art they will not be described in greater detail herein. The switch 330(1) and 330(2) are linked such that only two connection states are used (i.e., combined into a double throw double position switch), such that in one state, output 324(1) is connected to electrode 314(1) and output 324 (2) is connected to electrode 314(2), and in the other state, output 324(1) is connected to electrode 316(1) and output 324(2) is connected to electrode 316(2). The purpose of these two states is to change the phase of the two orthogonal vibrations, and the direction of the movable member.

The operation of the semi-resonant driving system 300 will now be described with reference to FIGS. 17A-21B. The elongated structure 303 also has two bending modes, mode1 and mode2, which each have a different resonant frequency. The vibration amplitude in either of these bending modes is dependent on the vibration frequency of the applied signals. In this embodiment, the vibration system 304 applies vibration signals which are at a vibration frequency for the bending modes of structure 303 which are at semi-resonance, although other frequencies can be used. When the switch 330(1) applies the vibration signal on output 324(1) to the electrode 314(1) and the switch 330(2) applies the vibration signal on output 324(2) to the electrode 314(2) and no signals are applied to electrodes 316(1) and 316(2), the structure is driven in an elliptical trajectory as illustrated in FIG. 20A. When the switch 330(1) applies the vibration signal on output 324(1) to the electrode 316(1) and the switch 330(2) applies the vibration signal on output 324(2) to the electrode 316(2) and no signals are applied to electrodes 314(1) and 314(2), the structure is driven in another elliptical trajectory as illustrated in FIG. 20B. In this embodiment, only one piezoelectric region is energized to simultaneously bend structure 303 in both bending mode 1 and mode 2. The phase shift between mode 1 and mode 2 is substantially fixed by the physical properties of the structure 303; in order to change phase shift and thus change direction, a different piezoelectric region must be driven, which is accomplished by the switches 330(1) and 330(2).

In an alternative embodiment, assume the structure 303 has a substantially symmetrical shape so the resonant frequencies in each of the bending modes are substantially the same. When the switch 330(1) applies the vibration signal on output 324(1) to the electrode 314(1) and the switch 330(2) applies the vibration signal on output 324(2) to the electrode 314(2) and no signals are applied to electrodes 316(1) and 316(2), the structure is driven in a linear trajectory as illustrated in FIG. 21A. When the switch 330(1) applies the vibration signal on output 324(1) to the electrode 316(1) and the switch 330(2) applies the vibration signal on output 324(2) to the electrode 316(2) and no signals are applied to electrodes 314(1) and 314(2), the structure is driven in another linear trajectory as illustrated in FIG. 21B. In this embodiment, only one piezoelectric region is energized to simultaneously bend structure 303 in both bending mode 1 and mode 2. The phase shift between mode 1 and mode 2 is substantially fixed by the physical properties of the structure 303; in order to change phase shift and thus change direction, a different piezoelectric region must be driven, which is accomplished by the switches 330(1) and 330(2).

The elliptical orbit path for the actuator system 302 is that as illustrated in FIG. 6 for actuator system 102 and has two node points 128(1) and 128(2) and three anti-node points: mid, anti-node point 130; and end anti-node points 132(1) and 132(2). In this example, the mid, anti-node point 130 for the structure 303 also is used to frictional couple to and drive a movable element in one of at least two directions although other points could be used, such as end anti-node points 132(1) and 132(2). Additionally, since the embodiments of linear and circular motions system using the semi-resonant driving system 100 described with reference to FIGS. 8A-11B are the same for semi-resonant driving system 300, they will not be described again.

Referring to FIGS. 22A and 22B, an auto focus system 400 is used to control and drive a focus lens 410. The auto focus system 400 includes the semi-resonant driving system 100 with the actuator system 102 and vibration system 104 as illustrated and described herein, contact and frictional pads 402, opposing pads 407 and 408, groove 409, the focus lens 410, holes 411, a wire spring 415, a base 420, support points 421 and an opening notch 425, although the system 400 could comprise other types and numbers of systems, devices, components, and elements in other configurations. The actuator system 102 is bonded so that its two node points 128(1) and 128(2) (see FIG. 6) are at support points 421 on the base 420, although the actuator system 102 could be secured in other manners.

Three semi-sphere contact/frictional pads 402 are bonded to the ends of the actuator system 102. Two opposing pads 407 and 408 matching the contact and frictional pads are attached to focus lens 410. The pads 407 and 408 provide a linear guide to the lens 410 when the actuator system 102 is activated by the vibration system 104. Pad 408 has a "V" groove 409 that faces the two contact/frictional pads 402 and pad 407 has a flat surface which faces one contact and frictional pad 402. The contact pads 402 and opposing pads 407 and 408 may be made of a ceramic material, such as zirconia or alumina by way of example only. Additionally, the shape and size of the pads 402, 407, 408 are shown as small semi-spheres, however it will be appreciated that the pads 402, 407, 408 may be any size or shape.

The focus lens 410 is preloaded in the x direction by a wire spring 415 at the small holes 411 on the focus lens 410, although the focus lens can be loaded in other manners. The wire spring 415 is fixated at the opening notch 425 on the base 420 (which is shown as a cut view). The wire spring 415 both serves as a linear guide (for a limited range of lens travel) and provides a relatively constant preload force in the x direction to the lens 410 when the lens 410 moves. The lens 410 has negligible restoring force in the y axis when the lens 410 moves away from neutral position.

Referring to FIGS. 23A and 23B, an auto focus system 500 in accordance with other embodiments of the present invention is illustrated. The auto focus system 500 includes the semi-resonant driving system 200 with the actuator system 202 and vibration system 204 as illustrated and described herein, contact and frictional pad 502, groove 503, a metal shim 505, a leaf spring 506, a lens body 510, a double flexure 515, legs 516, a base 520, posts 521, a top surface 522, notches 523 and pivot points 530, although the system 500 could comprise other types and numbers of systems, devices, components, and elements in other configurations. The side walls of the auto focus system 500 are not shown in FIGS. 23A and 23B for clarity.

The actuator system 202 is bonded at the node points 128(1) and 128(2) (see FIG. 6) by a leaf spring 506, although the actuator system 202 could be secured in other manners. The leaf spring 506 is pre-cut and semi-released from an "L" shaped larger metal shim 505, although the leaf spring could be formed in other manners and has other shapes and configurations. Two pivot points 530 connect the shim 505 and leaf spring 506 together, although other types and numbers of connection points can be used. The shim 505 and leaf spring 506 can be formed together using, for example, chemical photo-etching, wire EDM, or micromachining techniques. The leaf spring 506 is also pre-bent towards the actuator system 202 to preload the actuator system 202 in the x axis. The pivot points 530 are somewhat flexible and therefore allow the actuator system 202 to align itself to the lens 510 during assembly of the auto focus system 500.

The contact and frictional pad 502 is bonded at the middle of actuator system 202 and can move along the linear groove 503 on side of the lens body 510, although the frictional pad can be secured in other manners. The contact and frictional pad 502 drives the lens 510 to move when the actuator system 202 is activated by the vibration system 204.

The lens body 510 is bonded to a double flexure 515 made from metal shim, which has four thin legs 516A and 516B. The base 520 of this system has two posts 521A and 521B. At the bottom of the posts 521A and 521B is a cut-out notch 523 in which the bottom legs 516B are inserted and bonded in place. The top legs 516A are bonded to the top surface 522 of the posts 521A and 521B.

The metal shim 505 which holds the actuator system 202 through the leaf spring 506 is bonded to the post 521B at the corner of the "L" shape. The leaf spring 506 provides the needed constant preload force in the x axis when the lens 510 moves, while the double flexure 515 serves as the linear guide for a limited lens travel range. The double flexure 515 has negligible restoring force in the y axis when the lens 510 moves away from neutral position.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A driving system comprising:
   a structure having at least one point to frictional couple to and drive a movable element in one of at least two directions, the structure having at least two bending modes, each of the bending modes having a different resonant frequency; and
   a vibration system that applies two or more vibration signals which are at a vibration frequency to each of the bending modes of the structure, the vibration frequency is substantially the same as one of the resonant frequencies, wherein at the vibration frequency one of the bending modes of the structure is vibrating substantially at resonance and the other of the bending modes of the structure is vibrating at partial resonance, the vibration system adjusts a phase shift between the two or more applied vibration signals to control which one of the at least two directions the moveable element is moved.

2. The system as set forth in claim 1 wherein the structure is asymmetrical.

3. The system as set forth in claim 1 wherein the at least one point is substantially an anti-node point of the structure.

4. The system as set forth in claim 1 wherein the structure comprises at least two piezoelectric regions that are poled to establish a specific polarity and are located symmetrically in the structure to generate a least one of the two bending modes in the structure when the vibration system applies at least one of the two or more vibration signals.

5. The system as set forth in claim 1 wherein the structure comprises at least four piezoelectric regions that are poled to establish a specific polarity and are located symmetrically in the structure to generate the at least two bending modes in the structure when the vibration system applies the two or more vibration signals.

6. The system as set forth in claim 5 wherein at least two of the piezoelectric regions are located between at least two other of the piezoelectric regions.

7. The system as set forth in claim 1 wherein the structure comprises:
   two or more piezoelectric layers; and
   a two or more pairs of electrodes, each of the pairs of electrodes coupled to opposing sides of one or more of the piezoelectric layers.

8. The system as set forth in claim 1 wherein the other one of the bending modes that is vibrating at partial resonance is bending in a direction substantially parallel to each of the at least two directions the structure can drive the movable element.

9. The system as set forth in claim 1 wherein the one of the bending modes that is vibrating at resonance is bending in a direction substantially parallel to each of the at least two directions the structure can drive the movable element.

10. A method for making a driving system, the method comprising:
    providing a structure having at least one point to frictional couple to and drive a movable element in one of at least two directions, the structure having at least two bending modes, each of the bending modes having a different resonant frequency; and
    coupling a vibration system that applies two or more vibration signals which are at a vibration frequency to each of the bending modes of the structure, the vibration frequency is substantially the same as one of the resonant frequencies, wherein at the vibration frequency one of the bending modes of the structure is vibrating substantially at resonance and the other of the bending modes of the structure is vibrating at partial resonance, the vibration system adjusts a phase shift between the two or more applied vibration signals to control which one of the at least two directions the moveable element is moved.

11. The method as set forth in claim 10 wherein the structure is asymmetrical.

12. The method as set forth in claim 10 wherein the at least one point is substantially an anti-node point of the structure.

13. The method as set forth in claim 10 wherein the structure comprises at least two piezoelectric regions that are poled to establish a specific polarity and are located symmetrically in the structure to generate a least one of the two bending modes in the structure when the vibration system applies at least one of the two or more vibration signals.

14. The method as set forth in claim 10 wherein the structure comprises at least four piezoelectric regions that are poled to establish a specific polarity and are located symmetrically in the structure to generate the at least two modes in the structure when the vibration system applies the two or more vibration signals.

15. The method as set forth in claim 14 wherein at least two of the piezoelectric regions are located between at least two other of the piezoelectric regions.

16. The method as set forth in claim 10 wherein the providing the structure further comprises:
    providing two or more piezoelectric layers; and
    coupling each of two or more pairs of electrodes to opposing sides of one or more of the piezoelectric layers.

17. The method as set forth in claim 10 wherein the other one of the bending modes that is vibrating at partial resonance is bending in a direction substantially parallel to each of the at least two directions the structure can drive the movable element.

18. The method as set forth in claim 10 wherein the one of the bending modes that is vibrating at resonance is bending in a direction substantially parallel to each of the at least two directions the structure can drive the movable element.

19. An optical system comprising:
    at least one optical component; and
    at least one driving system frictionally coupled to move the at least one optical component in one or more directions, the driving system comprising a structure and a vibration system, the structure having at least two bending modes, each of the bending modes having a different resonant frequency, the vibration system applies two or more vibration signals which are at a vibration frequency to each of the bending modes of the structure, the vibration frequency is substantially the same as one of the resonant frequencies, wherein at the vibration frequency one of the bending modes of the structure is vibrating substantially at resonance and the other of the bending modes of the structure is vibrating at partial resonance, the vibration system adjusts a phase shift between the two or more applied vibration signals to control which one of the at least two directions the optical component is moved.

20. The system as set forth in claim 19 wherein the structure is asymmetrical.

21. The system as set forth in claim 19 wherein the at least one point is substantially an anti-node point of the structure.

22. The system as set forth in claim 19 wherein the structure comprises at least two piezoelectric regions that are poled to establish a specific polarity and are located symmetrically in the structure to generate a least one of the two bending modes in the structure when the vibration system applies at least one of the two or more vibration signals.

23. The system as set forth in claim 1 wherein the structure comprises at least four piezoelectric regions that are poled to establish a specific polarity and are located symmetrically in the structure to generate the at least two bending modes in the structure when the vibration system applies the two or more vibration signals.

24. The system as set forth in claim 23 wherein at least two of the piezoelectric regions are located between at least two other of the piezoelectric regions.

25. The system as set forth in claim 19 wherein the structure comprises:
    two or more piezoelectric layers; and
    a two or more pairs of electrodes, each of the pairs of electrodes coupled to opposing sides of one or more of the piezoelectric layers.

26. The system as set forth in claim 19 wherein the other one of the bending modes that is vibrating at partial resonance is bending in a direction substantially parallel to each of the at least two directions the structure can drive the movable element.

27. The system as set forth in claim 19 wherein the one of the bending modes that is vibrating at resonance is bending in a direction substantially parallel to each of the at least two directions the structure can drive the movable element.

* * * * *